(12) United States Patent  (10) Patent No.: US 8,132,924 B2
Nishi et al.  (45) Date of Patent: Mar. 13, 2012

(54) LIGHT SOURCE DEVICE AND PROJECTOR

(75) Inventors: Toshizo Nishi, Matsumoto (JP);
Toshihiko Nagumo, Matsumoto (JP);
Masahiro Saito, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 224 days.

(21) Appl. No.: 12/751,095

(22) Filed: Mar. 31, 2010

(65) Prior Publication Data

US 2010/0253924 A1 Oct. 7, 2010

(30) Foreign Application Priority Data

Apr. 2, 2009 (JP) ................. 2009-090120

(51) Int. Cl.
*G03B 21/16* (2006.01)
(52) U.S. Cl. .......................... 353/61; 454/126
(58) Field of Classification Search ............ 353/61, 353/58; 454/126, 231
See application file for complete search history.

(56) References Cited

U.S. PATENT DOCUMENTS

| 7,275,834 B2 * | 10/2007 | Wang et al. ............ 353/61 |
| 7,641,546 B2 * | 1/2010 | Bok et al. .............. 454/239 |
| 7,674,165 B2 * | 3/2010 | Lu et al. ............... 454/184 |
| 2008/0231812 A1 | 9/2008 | Sakai et al. |

FOREIGN PATENT DOCUMENTS

| JP | 2002-258248 A | 9/2002 |
| JP | 2005-010505 A | 1/2005 |
| JP | 2008-262153 A | 10/2008 |

* cited by examiner

*Primary Examiner* — Seung C Sohn
(74) *Attorney, Agent, or Firm* — AdvantEdge Law Group, LLC

(57) ABSTRACT

A light source device includes: a light emitting tube; a reflecting mirror; and a tubular member disposed on a forward side of light emission of the reflecting mirror, and surrounding the light emitting tube, the tubular member has a pair of air circulating units communicating inside and outside of the tubular member and adapted to allow introduction of external air from the forward side toward a backward side of the light emission in a vertically symmetrical manner on a center axis of the light emitting tube, inside the air circulating unit there is disposed a air flow guide member, and the air flow guide member is pivoted rotatably around a predetermined rotational axis with respect to the air circulating unit under own weight of the air flow guide member, and rotates to thereby open and block at least a part of a flow passage inside the air circulating unit.

12 Claims, 13 Drawing Sheets

LIGHT SOURCE DEVICE AND PROJECTOR

BACKGROUND

1. Technical Field

The present invention relates to a light source device and a projector.

2. Related Art

In the related art, a discharge emission light source device causing discharge emission between a pair of electrodes has frequently been used as a light source device in a projector. Further, as such a projector, there has been also proposed a dual-lamp projector provided with two light source devices in order for improving the brightness of the projected image (see, e.g., JP-A-2002-258248 (Document 1)).

Specifically, in the projector described in the Document 1, the two light source devices are disposed on the rear side, which is opposed to the position where a projection lens for projecting the image is disposed, inside an exterior housing forming an outer package, and is disposed so as to be opposed to each other around a combining prism. Further, luminous fluxs emitted from the two light source devices are combined in the combining prism, and then output along the direction in which the image is projected from the projection lens.

Incidentally, as the light source device, there is provided a light emitting tube having a substantially spherical light emitting section provided with a pair of electrodes disposed therein. When such a light emitting tube is lit, the temperature of an upper portion of the light emitting section becomes the highest, and the temperature of a lower portion thereof becomes the lowest. If the high temperature state of the upper portion of such a light emitting section continues, devitrification becomes apt to occur on the one hand, if the difference in temperature between the upper portion and the lower portion becomes large, blackening becomes apt to occur on the other hand, and thus the light emitting tube becomes apt to be deteriorated.

Therefore, in the related art, there has been adopted a technology of providing an air induction port to the upper portion of the light emitting tube to thereby send air to the upper portion of the light emitting section via the air induction port in a housing for housing the light emitting tube and a reflecting mirror.

Incidentally, in the dual-lamp projector described in the Document 1, it is preferable that the two light source devices are made to have the same structure so that a certain light source device can be used as either one of the two light source devices when taking the cost and usability into consideration.

However, in the dual-lamp projector described in the Document 1, in the case in which the two light source devices are made to have the same structure, and at the same time the technology described above and a structure of replacing the two light source devices described below are adopted, the problem described below arises inevitably.

As the replacing structure of the two light source devices, it is possible to adopt a structure for performing the replacement from, for example, a lateral side of the projector.

Specifically, a replacing lid is detachably attached to a sidewall of an exterior housing on the rear side thereof, and the two light source devices are taken out from the rear side to the outside of the exterior housing in the state of keeping the replacing lid detached from the exterior housing. Further, by attaching two new light source devices to the inside of the exterior housing from the rear side, respective connectors (hereinafter referred to as light source side connectors) provided to the respective light source devices are connected to respective connectors (hereinafter referred to as housing side connectors) provided to the inside of the exterior housing, thus forming the state (the state in which the light emitting tube can light) in which electrical power is supplied to the light emitting tube via the respective connectors.

Further, in the case of adopting the replacing structure, the light source device (hereinafter referred to as a first light source device) disposed on the right viewed from the projection side is required to have the light source side connector facing to the right in view from the forward side of the light emission. On the other hand, the light source device (hereinafter referred to as a second light source device) disposed on the left viewed from the projection side is required to have the light source side connector facing to the left in view from the forward side of the light emission.

Specifically, in the case of making the two light source devices have the same structure, by for example disposing the first light source device and the second light source device so as to take postures vertically opposite to each other, it becomes possible to set the orientations of the light source side connectors to be the state described above in both of the light source devices.

However, in the case of adopting the technology described above, since the first light source device and the second light source device have the postures vertically opposite to each other, although the air induction port is located on the upper side in one of the light source devices, in the other of the light source devices the air induction port is located on the lower side.

In other words, although in the one of the light source devices the longer life of the light emitting tube can be achieved by sending the air to the upper portion of the light emitting section via the air induction port, the air is sent to the lower portion of the light emitting section via the air induction port in the other of the light source devices, and therefore, the longer life of the light emitting tube is not achievable.

Under the circumstances described above, there has been demanded a technology capable of achieving the longer life of the light emitting tubes in the respective light source devices even in the case in which the two light source devices having the same structure are incorporated in a projector, and at the same time, there is adopted the structure of replacing each of the light source devices from a lateral side of the projector.

SUMMARY

An advantage of some aspects of the invention is to provide a light source device and a projector capable of achieving the longer life of the light emitting tubes in the respective light source devices even in the case in which the two light source devices having the same structure are incorporated in the projector, and at the same time, there is adopted the structure of replacing each of the light source devices from a lateral side of the projector.

According to an aspect of the invention, there is provided a light source device including a light emitting tube having a light emitting section having a pair of electrodes disposed inside the light emitting section, a reflecting mirror adapted to reflect a luminous flux emitted from the light emitting section, and a tubular member disposed on a forward side of light emission of the reflecting mirror, and surrounding the light emitting tube, wherein the tubular member has a pair of air circulating units communicating inside and outside of the tubular member and adapted to allow introduction of external air from the forward side toward a backward side of the light emission in a vertically symmetrical manner on a center axis of the light emitting tube, inside the air circulating unit there is disposed a air flow guide member adapted to straighten the air introduced in the tubular member and make the air flow to the light emitting tube, and the air flow guide member is pivoted rotatably around a predetermined rotational axis with respect to the air circulating unit under own weight of the air flow guide member, and rotates to thereby open and block at least a part of a flow passage inside the air circulating unit.

In this aspect of the invention, the tubular member constituting the light source device is provided with the pair of air circulating units in a vertically symmetrical manner on the center axis of the light emitting tube. Thus, even in the case in which, in the dual-lamp projector having the two light source devices with the same structures, one of the light source devices and the other of the light source devices are disposed with postures vertically reversed to each other, since the pair of air circulating units is disposed in a vertically symmetrical manner, either one of the air circulating units (hereinafter referred to as a introducing air circulating unit) is located on the upper side with respect to the light emitting tube. Therefore, by introducing the external air into the tubular member via the introducing air circulating unit, the air can efficiently be fed to the upper portion of the respective light emitting sections from above the corresponding light emitting tube in both of the light source devices, thus longer life of each of the light emitting tubes can be achieved.

Therefore, since the longer life of each of the light emitting tubes in the respective light source devices can be achieved even in the case in which the two light source devices having the same structure are incorporated in a projector, and at the same time, there is adopted the structure of replacing each of the light source devices from a lateral side of the projector, the advantage of this aspect of the invention can be achieved.

Further, since the air flow guide member is disposed inside the air circulating unit, the air introduced into the tubular member via the introducing air circulating unit can be straightened with the air flow guide member, thus the air can further efficiently be fed to the upper portion of the light emitting section.

Incidentally, in the projector equipped with the light source device, for example, in the case in which it is configured that the projection direction of the image and the center axis of the light emitting tube in the light source device are substantially perpendicular to each other, the pair of air circulating unit is positioned as described below when the projector is installed with various postures.

Specifically, in the case of installing the projector with the normal setting posture (the normal setting posture when the projector is mounted on a mounting surface such as a desk), the pair of air circulating units is positioned above and below the center axis of the light emitting tube, respectively, as described above.

In the case in which the projector is thus installed with the normal setting posture, by introducing the external air into the tubular member via the introducing air circulating unit as described above, the air can efficiently be fed to the upper portion of the light emitting section from above the light emitting tube.

On the other hand, in the case in which the projector is installed with the upward projection posture of rotating the projector 90° around the center axis of the light emitting tube for projecting an image upward or with the downward projection posture of projecting an image downward, the pair of air circulating units is positioned on the left and right sides, respectively, around the center axis of the light emitting tube in view from the forward side of the light emission.

In the case in which the projector is thus installed with the upward projection posture or the downward projection posture, since the pair of air circulating units is positioned at the positions described above, it is difficult to feed the air efficiently to the upper portion of the light emitting section even if the external air is introduced into the tubular member via the introducing air circulating unit.

In this aspect of the invention, the air flow guide member is made to be able to rotate around the predetermined rotational axis under its own weight, and opens and blocks at least a part of the flow passage inside the air circulating unit in accordance with the rotating action. Thus, as described above, in the case in which the projector is installed with the upward projection posture or the downward projection posture, the air flow guide members rotate under the own weight to thereby make it possible to block the lower areas inside the introducing air circulating unit with the air flow guide members and open only the upper areas. Therefore, the external air passes through only the upper area inside the introducing air circulating unit, and the air can be fed to the upper portion of the light emitting section from the lateral side of the light emitting tube.

According to the fact described above, even in the case of installing the projector with various postures, it becomes possible to feed the air efficiently to the upper portion of the light emitting section, and to achieve longer life of the light emitting tube.

According to another aspect of the invention, in the light source device of the above aspect of the invention, it is preferable that the rotational axis is tilted with respect to the vertical axis so that a side distant from the center axis is located on the backward side of the light emission, in view from a direction perpendicular to a vertical axis and the center axis.

According to this aspect of the invention, the rotational axis is tilted with respect to the vertical axis as described above. Thus, in the case in which the projector is installed with the normal setting posture, the air flow guide member inside the introducing air circulating unit rotates under the own weight to thereby be positioned so that the tip portion faces to the backward side of the light emission. Therefore, in the case in which the projector is installed with the normal setting posture, the air flow guide members can be prevented from unnecessarily blocking the flow passage inside the introducing air circulating unit to thereby make it possible for the air flow guide members to appropriately straighten the air introduced into the tubular member via the introducing air circulating unit, thus the air can be fed efficiently to the upper portion of the light emitting section.

According to another aspect of the invention, in the light source device of the above aspect of the invention, it is preferable that the air flow guide member has a central area shielding section and an end area shielding section connected to each other so as to form a predetermined angle with each other, inside the air circulating unit, the air flow guide member is disposed at each of two positions located on a left side and a right side, respectively, side by side so that the respective end area shielding sections are separated from each other, and the two air flow guide members rotate, when the flow passage of the air flowing inside the air circulating unit is divided into three areas of a central area located in a center of the flow passage and end areas located respectively on the left and right of the central area, to one of a first rotational position where the central area is opened and the end areas are blocked with the end area shielding section, and a second rotational position where the end areas are opened and the central area is blocked with the central area shielding section.

According to this aspect of the invention, two air flow guide members each provided with the central area shielding section and the end area shielding section are disposed side by side inside the air circulating unit as described above.

Therefore, in the case of installing the projector with various postures, the two air flow guide members inside the air circulating unit rotate to the positions described below by setting the barycentric position to a predetermined position.

Specifically, in the case of installing the projector with the normal setting posture, the two air flow guide members rotate to the first rotational position under the own weight, where only the central area of the introducing air circulating unit is opened. Therefore, the external air passes through only the central area of the introducing air circulating unit, and the air can be fed to the upper portion of the light emitting section from above the light emitting tube.

Further, in the case of installing the projector with the upward projection posture or the downward projection posture, the two air flow guide members are naturally positioned on the upper side and the lower side, respectively. Therefore, the air flow guide member positioned on the upper side rotates to the second rotational position under the own weight, where the end area located on the upper side inside the introducing air circulating unit is opened, and the central area is blocked. On the other hand, the air flow guide member positioned on the lower side rotates to the first rotational position under the own weight, where the end area located on the lower side inside the introducing air circulating unit is blocked. Therefore, only the end area located on the upper side of the inside of the introducing air circulating unit can be opened using the two air flow guide members. Therefore, the external air passes through only the end area on the upper side of the inside of the introducing air circulating unit, and the air can be fed to the upper portion of the light emitting section from the lateral side of the light emitting tube.

According to the fact described above, in the case of installing the projector with various postures, by narrowing the flowing passage inside the introducing air circulating unit using the two air flow guide members, it is possible to feed the air locally to the upper portion of the light emitting section to thereby cool the light emitting section efficiently.

According to another aspect of the invention, in the light source device of the above aspect of the invention, it is preferable that the central area shielding section is formed to be longer than a distance between the two air flow guide members, and the central area shielding section of one of the two air flow guide members touches the central area shielding section of the other of the two air flow guide members when the one of the two air flow guide members rotates to the second rotational position.

Incidentally, in the case in which the central area shielding section is made to have substantially the same or shorter dimension as the distance between the two air flow guide members, both of the two air flow guide members might rotate to the second rotational positions, and the respective central area shielding sections might overlap with each other. In the case in which the central area shielding sections of the respective two air flow guide members overlap with each other, it becomes difficult for the two air flow guide members to rotate from the second rotational position to the first rotational position due to the influence of the friction between the central area shielding sections.

According to this aspect of the invention, the central area shielding sections are each formed to be longer than the distance between the two air flow guide members, and the central area shielding section of one of the two air flow guide members touches the central area shielding section of the other of the two air flow guide members when the one of the two air flow guide members rotates to the second rotational position. Thus, in the case in which the one of the air flow guide members has rotated to the second rotational position, it can prevent the other of the air flow guide members from rotating to the second rotational position, and position the other of the air flow guide members at the first rotational position. In other words, it is possible to prevent that both of the two air flow guide members rotate to the respective second rotational positions to thereby make the respective central area shielding sections overlap with each other.

Therefore, in the case of installing the projector with various postures, it is possible to preferably achieve the advantage that the two air flow guide members can smoothly be rotated to the desired rotational positions, and the air can be fed locally to the upper portion of the light emitting section described above to thereby make it possible to efficiently cool the light emitting section.

According to another aspect of the invention, in the light source device of the above aspect of the invention, it is preferable that the central area shielding section and the end area shielding section are connected to each other so as to form an acute angle with each other, and the end area shielding section is positioned so as to be parallel to the flow passage of the air flowing inside the air circulating unit when the air flow guide member is positioned at the second rotational position.

According to this aspect of the invention, it is configured that the central area shielding section and the end area shielding section are connected as described above, thereby making the end area shielding section substantially parallel to the flow passage of the air when the air flow guide members are positioned at the respective second rotational positions. Thus, in the case of installing the projector with the upward projection posture or the downward projection posture, the external air passing through the end area located on the upper side of the introducing air circulating unit is prevented from being changed in the flow direction by the end area shielding section, and is preferably straightened by the end area shielding section, thus it becomes possible to efficiently feed the air to the upper portion of the light emitting section.

According to another aspect of the invention, in the light source device of the above aspect of the invention, it is preferable that the tubular member has a discharge port adapted to discharge internal air to outside.

Incidentally, the air circulating unit (hereinafter referred to as a discharging air circulating unit) other than the introducing air circulating unit out of the pair of air circulating units functions so as to discharge the air having been fed to the upper portion of the light emitting section via the introducing air circulating unit to the outside of the tubular member.

Here, inside the discharging air circulating unit, there is provided a air flow guide member capable of rotating under its own weight similarly to the introducing air circulating unit.

Further, when the air flow guide member inside the discharging air circulating unit rotates under the own weight to block at least apart of the flow passage of the discharging air circulating unit, the flow passage area of the air discharged via the discharging air circulating unit becomes smaller than the flow passage area of the air introduced via the introducing air circulating unit. In the case in which the flow passage area of the discharge side becomes smaller than the flow passage area of the introduction side as described above, the air introduced in the tubular member is apt to be retained inside the tubular member, and therefore, the cooling efficiency of the light emitting tube becomes lowered.

According to this aspect of the invention, since the discharge port is provided to the tubular member, even in the case in which the air flow guide member inside the discharging air circulating unit rotates under the own weight to block at least a part of the flow passage of the discharging air circulating unit, it becomes possible to increase the flow passage area on the discharge side with respect to the flow passage area on the introduction side accordingly to the discharge port thus provided. Therefore, it becomes possible to prevent the air introduced into the tubular member from being retained inside the tubular member to thereby improve the cooling efficiency of the light emitting tube.

According to still another aspect of the invention, there is provided a projector including the light source device according to any one of the above aspects of the invention, a light modulation device adapted to modulate a luminous flux emitted from the light source device in accordance with image information, and a projection optical device adapted to project the luminous flux modulated in the light modulation device, wherein the pair of light source devices is disposed so that the center axes are substantially aligned with and opposed to each other, and substantially perpendicular to a projection direction of the luminous flux from the projection optical device.

According to this aspect of the invention, since the projector is provided with two light source devices described above, and the two light source devices are disposed as described above, the function and the advantages substantially the same as in the light source devices described above can be obtained.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Figure 1:
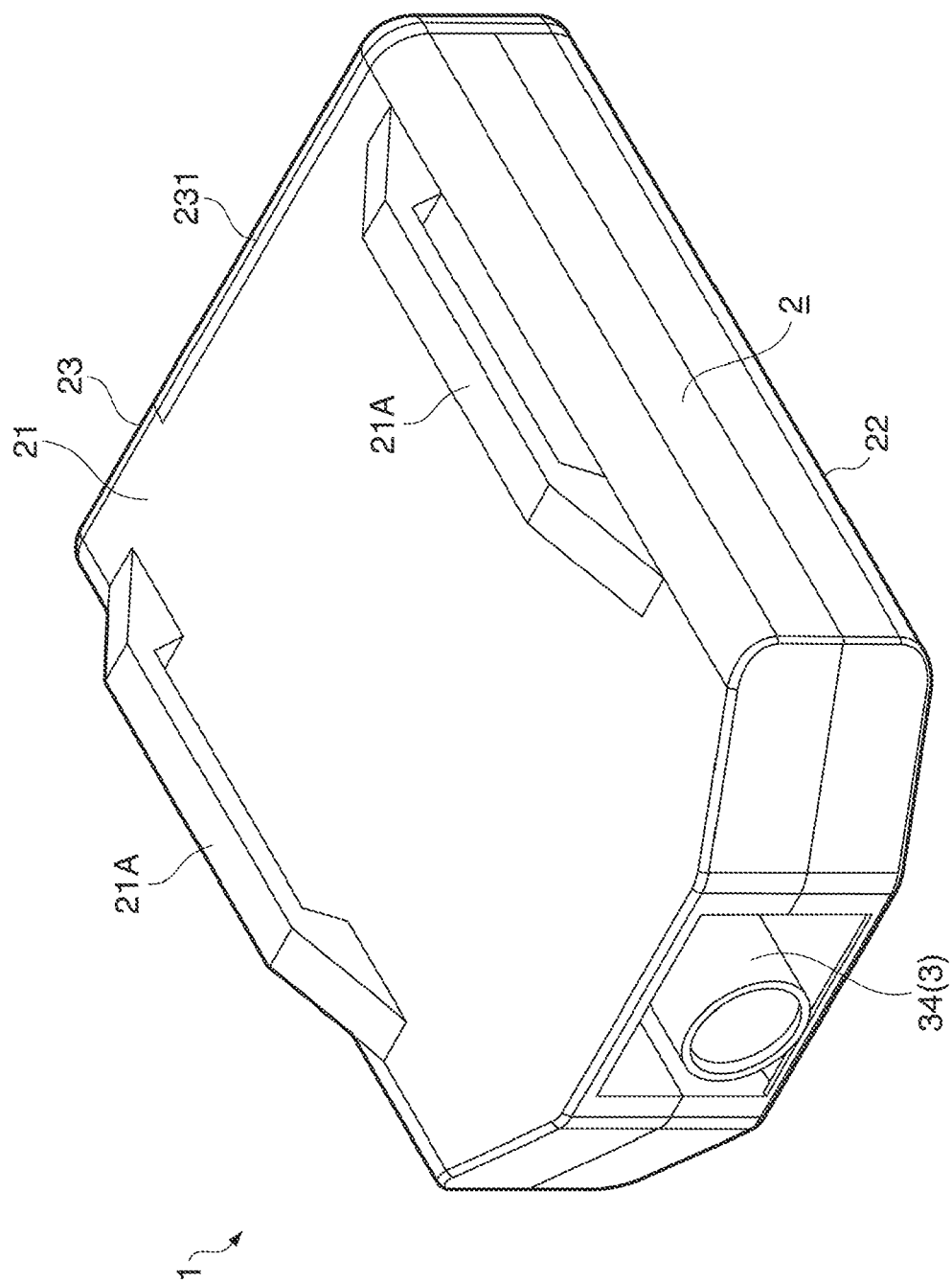
FIG. 1 is a perspective view showing an external appearance of a projector according to a first embodiment.

A first embodiment of the invention will hereinafter be explained with reference to the accompanying drawings.
Configuration of Projector FIG. 1 is a perspective view showing the external appearance of a projector 1 according to the first embodiment. Specifically, FIG. 1 is a perspective view showing the condition in which the projector 1 is installed with a normal setting posture.

The projector 1 forms an image corresponding to image information and then projects it on a screen (not shown). As shown in FIG. 1, the projector 1 is composed mainly of an exterior housing 2 forming an exterior, and an optical unit 3 (see FIG. 2) housed inside the exterior housing 2.

As shown in FIG. 1, the exterior housing 2 is formed to have a substantially rectangular solid having a top surface section 21 and a bottom surface section 22 overlapping with each other in a vertical direction when the projector 1 is installed with the normal setting posture.

In the exterior housing 2, a pair of handles 21A is attached to the top surface section 21, as shown in FIG. 1.

The pair of handles 21A corresponds to members gripped by the user when the projector 1 is carried, and is each formed to have a substantially U shape. Further, the pair of handles 21A is each attached to the top surface section 21 at the both ends of the U shape so that the pair of handles 21A is parallel to each other and each extends in a longitudinal direction (a direction along a projection direction of the image projected from a projection lens 34).

Further, although specific illustrations are omitted, the pair of handles 21A is each provided with a plurality of threaded screw holes with which a mounting bracket for ceiling mount is attached when installing the projector 1 with a ceiling mount posture (the posture with which the projector 1 is suspended from the ceiling or the like).

In other words, the projector 1 according to the present embodiment is designed so as to take a posture (a posture in which the top surface section 21 faces to the upper side and the bottom surface section 22 faces to the lower side) the same as the normal setting posture when the projector 1 is installed with the ceiling mount posture.

Figure 2:
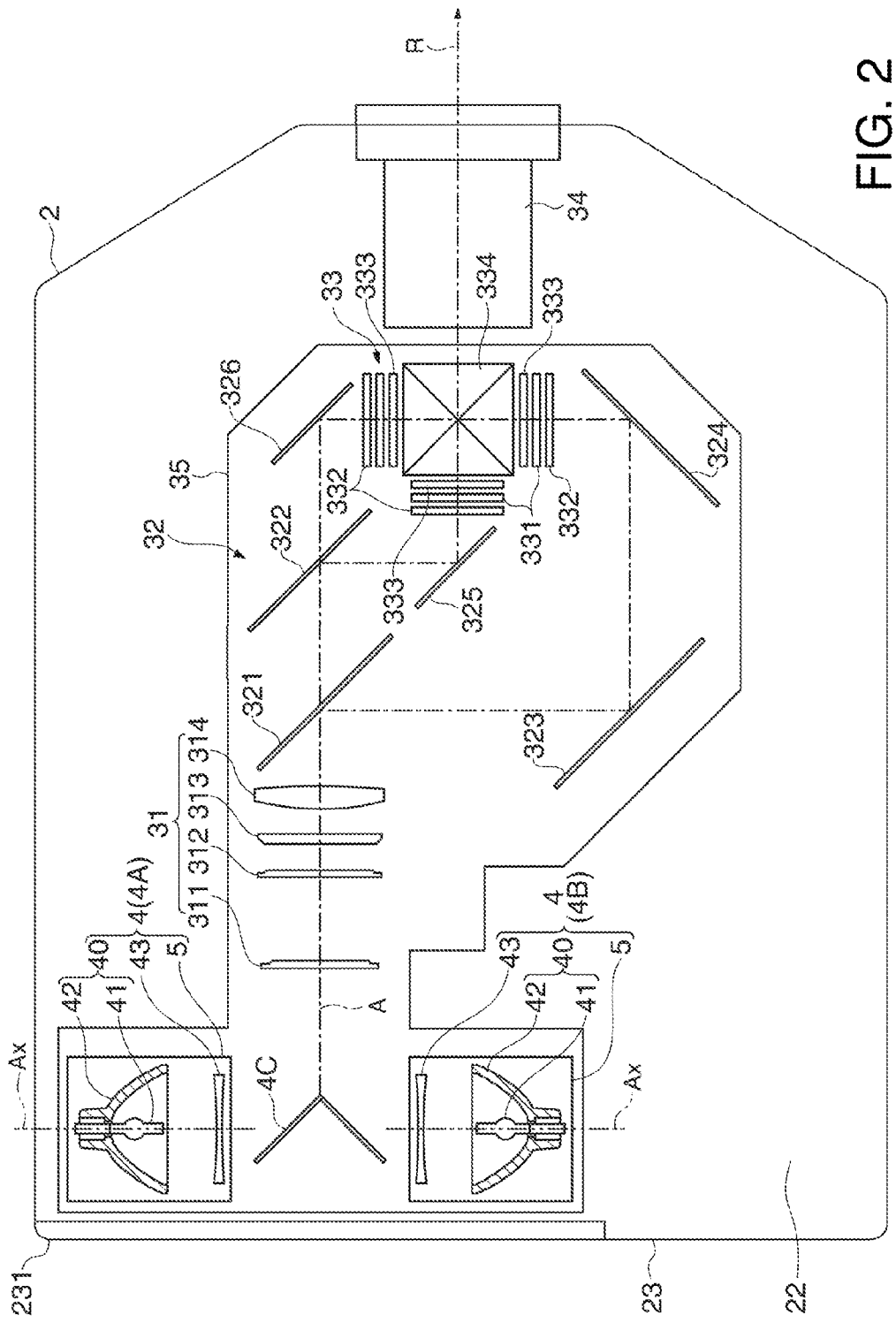
FIG. 2 is a diagram showing an internal structure of the projector according to the first embodiment.

Further, in the exterior housing 2, a replacing lid 231 constituting a part of the rear surface section 23 is attached to a rear surface section 23 located on the opposite side to the side on which the projection lens 34 is disposed, and adjacent to both of the top surface section 21 and the bottom surface section 22, as shown in FIGS. 1 and 2.

The replacing lid 231 is configured so as to be detachably attached to the exterior housing 2, and makes it possible to replace light source devices 4 described later when being detached.

Configuration of Optical Unit

FIG. 2 is a diagram showing an internal structure of the projector 1.

The optical unit 3 forms an image in accordance with image information and then projects the image under control of a control device (not shown).

As shown in FIG. 2, the optical unit 3 is provided with a pair of light source devices 4, a reflecting mirror 4C, an illumination optical device 31 including lens arrays 311, 312, a polarization conversion element 313, and an overlapping lens 314, a color separation optical device 32 including dichroic mirrors 321, 322 and reflecting mirrors 323 through 326, an optical device 33 including three liquid crystal panels 331, three entrance side polarization plates 332, and three exit side polarization plates 333 as light modulation devices, and a cross dichroic prism 334 as a color combining optical device, the projection lens 34 as a projection optical device, and an optical component housing 35 for housing the members 4, 4C, and 31 through 33 described above in the inside thereof.

Here, as shown in FIG. 2, the pair of light source devices 4 is disposed so as to have the center axes Ax (the center axes of the luminous fluxes emitted from the respective light source devices 4) of light emitting tubes 41 described later substantially aligned with each other, and to be opposed to each other across the reflecting mirror 4C to thereby emit the luminous fluxs toward the reflecting mirror 4C. Further, the pair of light source devices 4 is disposed so that the center axes Ax are substantially perpendicular to a projection direction R (FIG. 2) of the image from the projection lens 34.

It should be noted that hereinafter the light source device 4 disposed on the right in view from the front side on which the projection lens 34 is disposed is denoted as a first light source device 4A, and the light source device 4 disposed on the left is described as a second light source device 4B for the sake of convenience of explanation.

Further, the detailed structure of the light source devices 4 will be described later.

Further, in the optical unit 3, according to the configuration described above, the luminous flux emitted from each of the light source devices 4 is reflected by the reflecting mirror 4C along an illumination light axis A (FIG. 2) set inside the optical component housing 35, and is then emitted to the illumination optical device 31. The luminous flux emitted to the illumination optical device 31 is equalized in in-plane illuminance by the illumination optical device 31, and at the same time, separated by the color separation optical device 32 into three colored luminous fluxs of red (R), green (G), and blue (B). The colored luminous fluxs thus obtained by the separation are respectively modulated by the respective liquid crystal panels 331 in accordance with the image information, and thus the images of the respective colored luminous fluxs are formed. The images of the respective colored luminous fluxs are combined by the cross dichroic prism 334, and then projected on the screen (not shown) via the projection lens 34.

Configuration of Light Source Device

Then, the configuration of each of the light source devices 4 will be explained.

It should be note that since each of the light source devices 4 has substantially the same configuration, only the configuration of the first light source device 4A will hereinafter be explained.

Further, hereinafter, the light emission side of the first light source device 4A is denoted as a "forward side," and the opposite side to the light emission side is described as a "backward side" for the sake of convenience of explanation.

Figure 3:
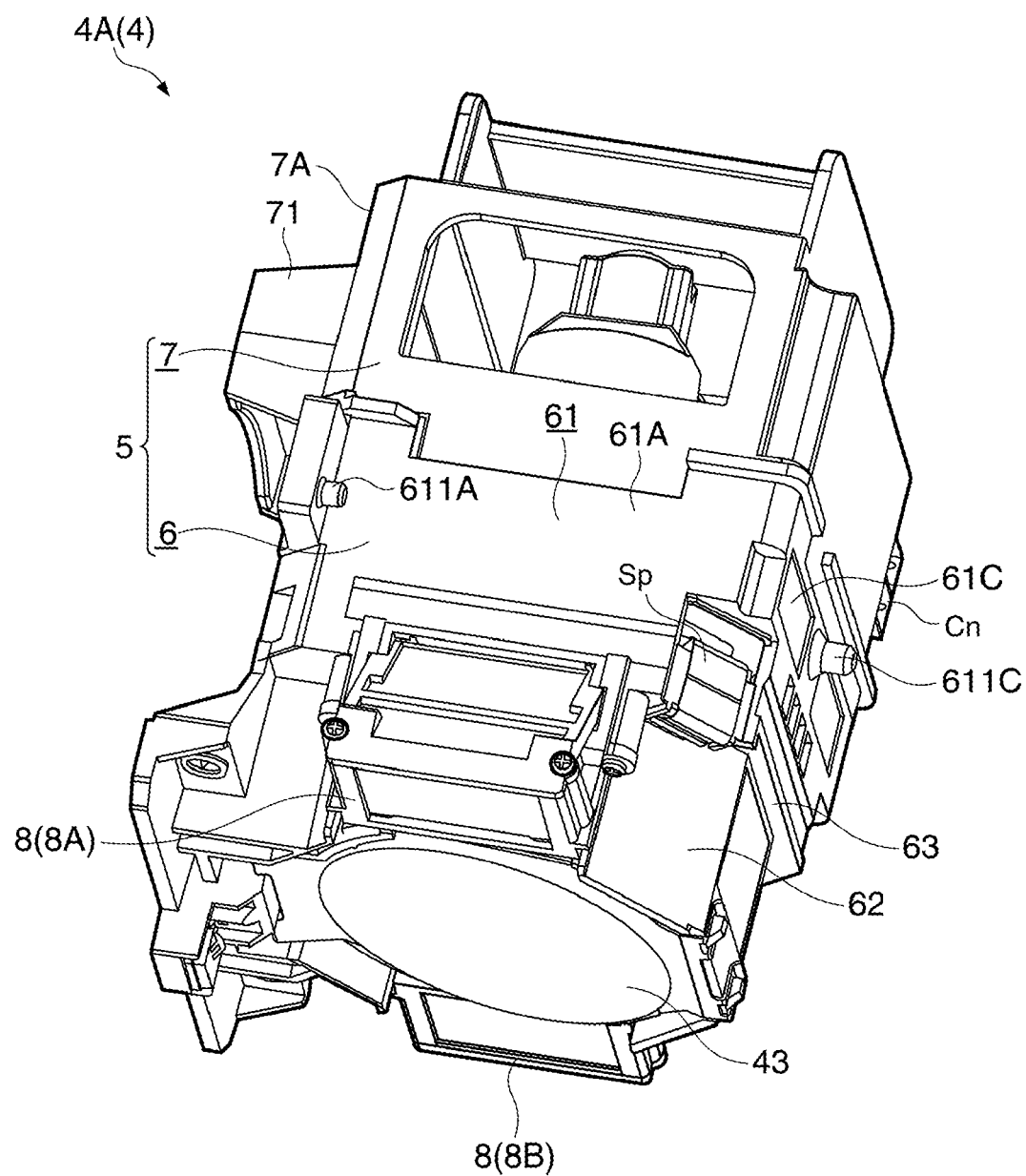
FIG. 3 is a diagram showing an external appearance of a first light source device according to the first embodiment.
Figure 4:
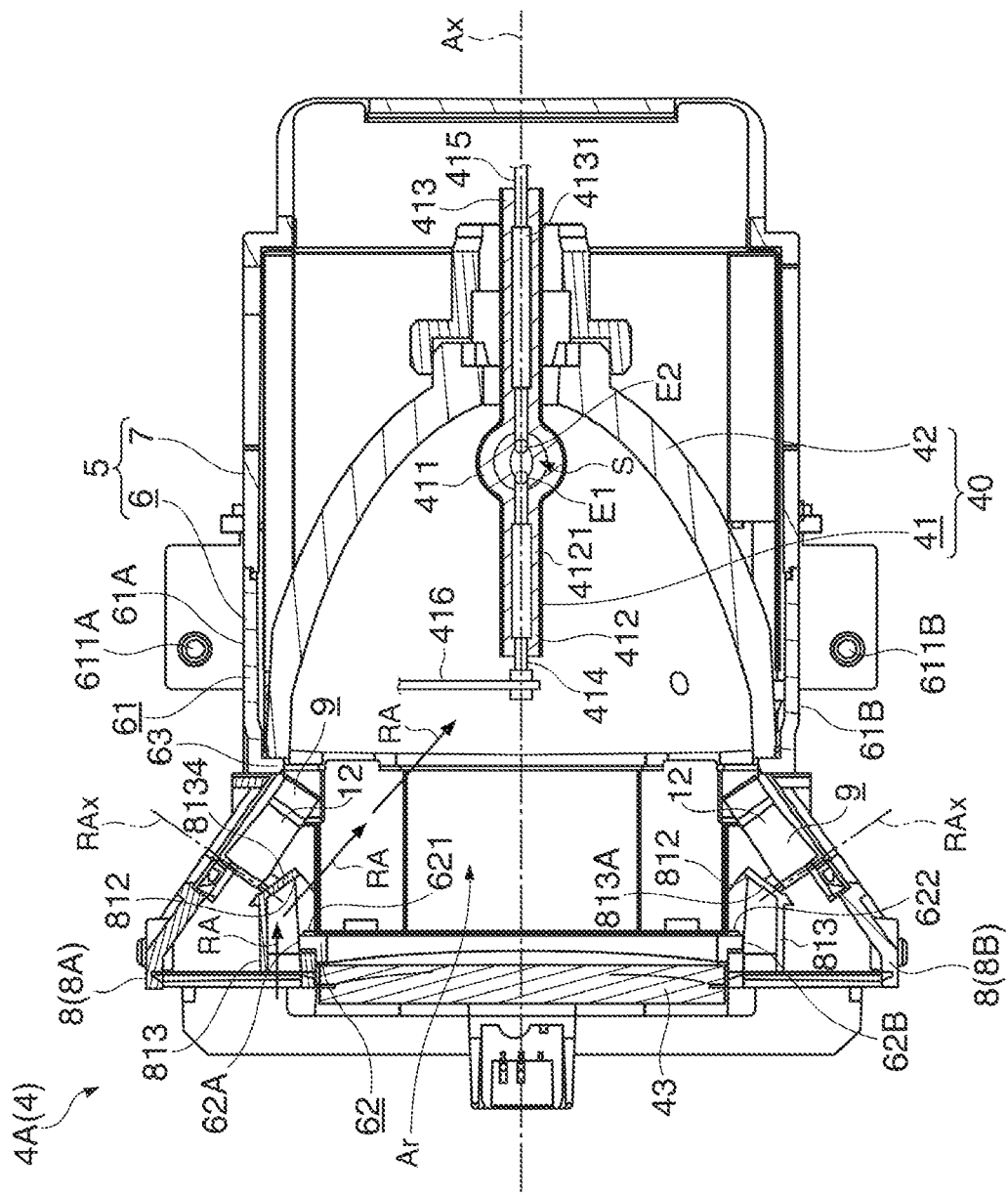
FIG. 4 is a diagram showing the external appearance of the first light source device according to the first embodiment.

FIGS. 3 and 4 are diagrams showing an external appearance of the first light source device 4A. Specifically, FIG. 3 is a perspective view of a posture state of the first light source device 4A in the case in which the projector 1 is installed with the normal setting posture, viewed from the forward side of the light emission. In other words, in FIG. 3 the upper side corresponds to the side of the top surface section 21, and the lower side corresponds to the side of the bottom surface section 22. FIG. 4 is a vertical cross-sectional view of the first light source device 4A cut by a plane passing through the center axis Ax of the light emitting tube 41.

As shown in FIG. 3 or FIG. 4, the first light source device 4A is provided with a light source device main body 40 (FIGS. 2 and 4) including the light emitting tube 41 (FIGS. 2 and 4) and a reflecting mirror 42 (FIGS. 2 and 4), and a collimating lens 43, and is further provided with a housing 5 for housing these components in the inside thereof.

As shown in FIG. 4, the light emitting tube 41 has a light emitting section 411 bulging out to have a substantially spherical shape, and a pair of sealing sections 412, 413 sandwiching the light emitting section 411 and respectively extending from the both ends of the light emitting section 411 in a direction of increasing the distance therebetween.

It should be noted that hereinafter the sealing section 412 on the front out of the pair of sealing sections 412, 413 is described as a front sealing section 412, and the sealing section 413 on the rear thereof is described as a rear sealing section 413 for the sake of convenience of explanation.

In the inside of the light emitting section 411, there is disposed a pair of electrodes E1, E2, and a discharge space S, in which a light-emitting material including mercury, noble gas, and a small amount of halogen is encapsulated, is formed between the pair of electrodes E1, E2.

In the inside of each of the sealing sections 412, 413, there is inserted a metal foil 4121 (4131) made of molybdenum and electrically connected to the electrode E1 (E2), and an end of each of the sealing sections 412, 413 on the opposite side to the side of the light emitting section 411 is sealed with a glass material or the like.

To these metal foils 4121, 4131, there are respectively connected electrode lead wires 414, 415 extending outside the light emitting tube 41, and when applying a voltage to these electrode lead wires 414, 415, light is emitted in the inside of the light emitting section 411.

It should be noted that an end of a lead wire 416 connected to a first connector Cn (FIG. 3) disposed on the outside of the housing 5 is deposited to the electrode lead wire 414 provided to the front sealing section 412 in order for applying a voltage to the electrode lead wire 414.

The reflecting mirror 42 reflects the luminous flux input thereto, and converges it at a predetermined focal position.

Then, the light emitting tube 41 is fixed to the reflecting mirror 42 in the rear sealing section 413 so that the emission center of the light emitting section 411 is located at the focal position of the reflecting mirror 42.

In other words, the light emitting tube 41 is disposed inside the reflecting mirror 42 expanding to have a substantially concave cross-sectional shape, as shown in FIG. 4.

The housing 5 supports the light source device main body 40 and the collimating lens 43 so as to integrate these optical components 40, 43. As shown in FIG. 3 or FIG. 4, the housing 5 is provided with a tubular member 6 and a shielding member 7.

As shown in FIG. 3 or FIG. 4, the shielding member 7 is a member attached to the posterior side of the tubular member 6, and for shielding the posterior side of the reflecting mirror 42.

As shown in FIG. 3, in the shielding member 7, the left end surface 7A thereof is provided with a gripper 71, which is gripped by the user when attaching and detaching the first light source device 4A into and out of the exterior housing 2 (replacing the light source device 4A).

The tubular member 6 is formed so as to surround the light emitting tube 41 and to extend along the center axis Ax (FIG. 4) of the light emitting tube 41.

More specifically, as shown in FIG. 3 or FIG. 4, the tubular member 6 has a first tubular section 61 located on the posterior side, and a second tubular section 62 located on the anterior side and having an outer size smaller than that of the first tubular section 61, the first and second tubular sections being formed integrally via a step section 63.

Further, the light source device main body 40 is fixed to the tubular member 6 while being biased by a leaf spring Sp (FIG. 3) toward the second tubular section 62 in the state in which the anterior end of the reflecting mirror 42 expanding to have a substantially concave cross-sectional shape has contact with the step section 63.

Further, as shown in FIG. 3 or FIG. 4, the collimating lens 43 is fixed to the anterior end of the second tubular section 62.

By fixing the light source device main body 40 and the collimating lens 43 to the tubular member 6 as described above, a posterior opening of the second tubular section 62 is blocked by the light source device main body 40, and an anterior opening thereof is blocked by the collimating lens 43, thus forming a space Ar (FIG. 4) surrounded by the second tubular section 62, the light source device main body 40, and the collimating lens 43.

As shown in FIG. 3 or FIG. 4, in the first tubular section 61, end surfaces 61A through 61C on the upper side, the lower side, and the right side thereof are respectively provided with positioning projections 611A through 611C projected to the right in the drawing, and for positioning the first light source device 4A at a desired location with respect to the optical component housing 35.

Further, as shown in FIG. 3, in the first tubular section 61, an end surface 61B on the lower side thereof is provided with the first connector Cn so as to face to the right.

Specifically, the user replaces the first light source device 4A in a manner as described below.

Firstly, the user detaches the replacing lid 231 from the exterior housing 2, grips the gripper 71 of the first light source device 4A attached to the inside of the exterior housing 2, and then draws it to the outside of the exterior housing 2.

Subsequently, the user inserts the new first light source device 4A into the inside of the exterior housing 2 from the right hand end surface 61C with the posture as shown in FIG. 3 while gripping the gripper 71 of the new first light source device 4A. Further, by fitting the respective positioning projections 611 into three positioning holes (not shown) provided to the optical component housing 35, the first light source device 4A is positioned at a desired location with respect to the optical component housing 35.

Further, by connecting the first connector Cn to a second connector (not shown) disposed in the inside of the exterior housing 2, there is set the state (the state in which the light emitting tube 41 can be lit) in which the light emitting tube 41 can be supplied with electrical power via the respective connectors Cn.

It should be noted that when attaching the second light source device 4B to the inside of the exterior housing 2, the user executes the replacing operation in substantially the same manner as described above with the posture obtained by vertically reversing (rotated 180°) the posture shown in FIG. 3 around the center axis Ax.

As shown in FIG. 4, in the second tubular section 62, the upper surface section 62A on the upper side and the lower surface section 62B on the lower side are respectively provided with an upper opening 621 and a lower opening 622 communicated with the space Ar.

Further, as shown in FIG. 3 or FIG. 4, the second tubular section 62 is provided with air circulating units 8 so as to respectively block the upper opening 621 and the lower opening 622.

The pair of air circulating units 8 each has the same configuration, and is attached respectively to the upper surface section 62A and the lower surface section 62B in a vertically symmetrical manner (a 180° rotationally symmetric manner) about the center axis Ax.

It should be noted that hereinafter the air circulating unit 8 attached to the upper surface section 62A is described as an introducing air circulating unit 8A, and the air circulating unit 8 attached to the lower surface section 62B is described as a discharging air circulating unit 8B for the sake of convenience of explanation.

Further, hereinafter, only the introducing air circulating unit 8A will be explained. Since the discharging air circulating unit 8B is disposed after simply being rotated 180° around the center axis Ax with respect to the introducing air circulating unit 8A, the explanation therefor will be omitted.

Figure 5A:
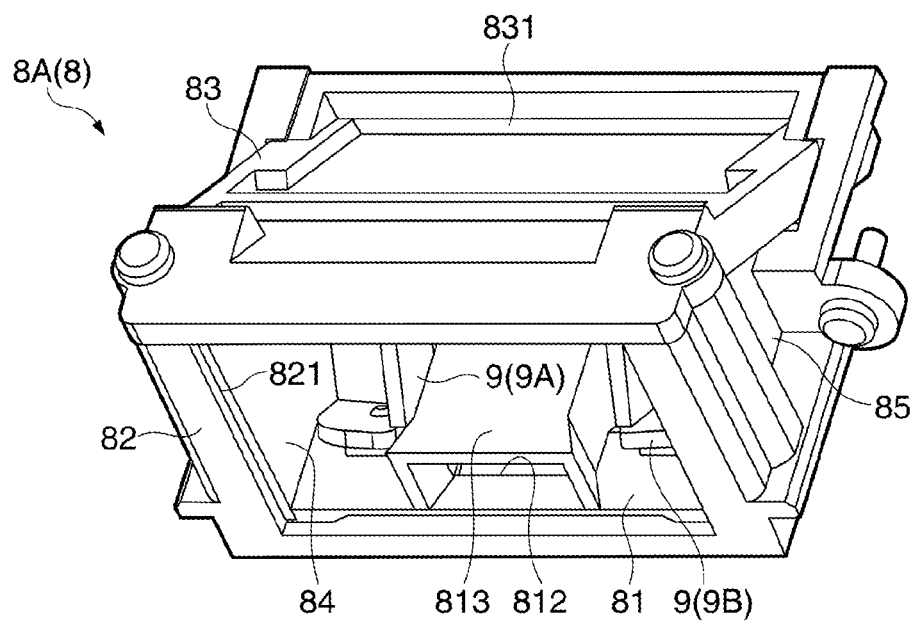
FIGS. 5A and 5B are perspective views showing a configuration of an introducing air circulating unit in the first embodiment.
Figure 5B:
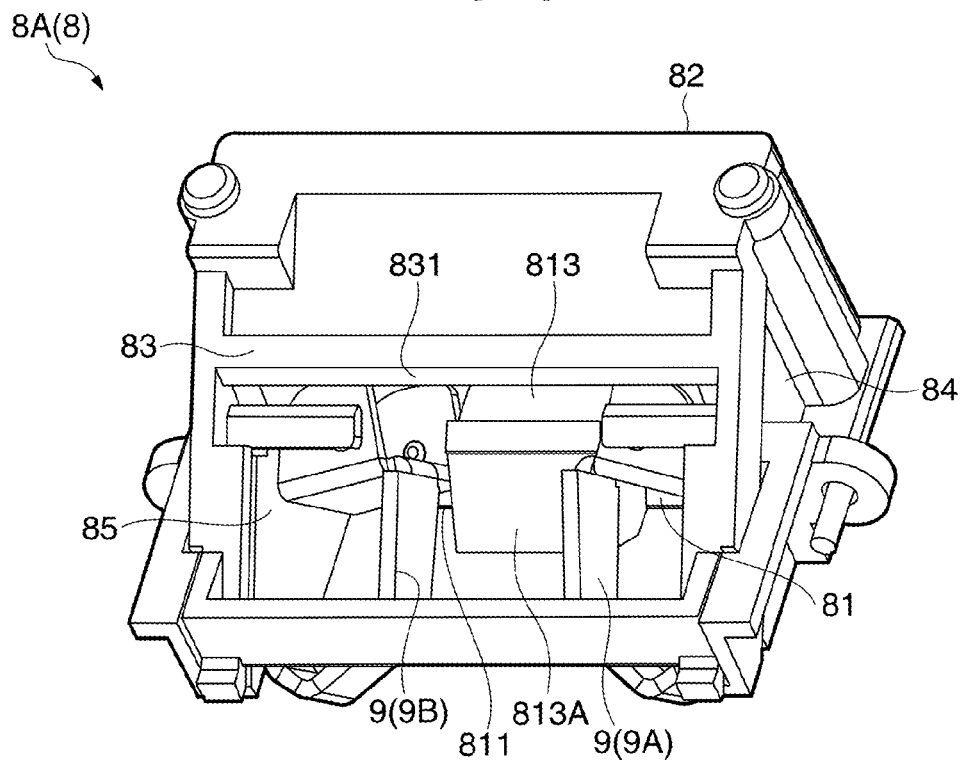

FIGS. 5A and 5B are perspective views showing the configuration of the introducing air circulating unit 8A. Specifically, FIG. 5A is a perspective view of the introducing air circulating unit 8A in the first light source device 4A with the posture shown in FIG. 3 viewed from the front thereof, and FIG. 5B is a perspective view thereof viewed from the rear thereof.

The introducing air circulating unit 8A is communicated with the space Ar via the upper opening 621, and introduces the external air into the space Ar from the front side to the rear side. As shown in FIGS. 5A and 5B, the introducing air circulating unit 8A is formed of a hollow member with a vertical cross-sectional shape of a substantially rectangular triangle having a lower wall section 81, a front wall section 82, a tilted sidewall section 83, a left sidewall section 84, and a right sidewall section 85.

As shown in FIGS. 5A and 5B, the lower wall section 81 is a portion located on the lower side, having a rectangular planar shape extending in substantially parallel to the horizontal plane, and connected to the upper surface section 62A of the second tubular section 62.

As shown in FIG. 5B, to the rear side of the lower wall section 81, there is provided a first lower communication port 811 having a rectangular planar shape for communicating the space Ar and the inside of the introducing air circulating unit 8A via the upper opening 621.

Further, at the substantially central position in a horizontal direction in the lower wall section 81, there is provided a second lower communication port 812 (FIGS. 4 and 5A) extending frontward from a front edge of the first lower communication port 811.

Further, as shown in FIGS. 5A and 5B, at the substantially central position in the horizontal direction on the upper surface of the lower wall section 81, there is disposed a sealing section channel 813 having a cross-sectional shape of a substantially U shape covering the second lower communication port 812, and extending from the front side to the rear side.

On the rear side of the sealing section channel 813, there is provided a tilted surface 813A (FIGS. 4 and 5B) tilted downward along a backward direction.

In other words, the air flowing through the sealing section channel 813 is straightened by the tilted surface 813A to thereby be introduced to the space Ar via the second lower communication port 812 and the upper opening 621, and then fed toward a tip portion of the front sealing section 412, as indicated by the arrow RA shown in FIG. 4. By feeding the air to the tip portion of the front sealing section 412, the tip portion of the front sealing section 412 is cooled, and thus keeping the adhesion (connection) state between the metal foil 4121 inside the front sealing section 412 and the electrode lead wire 414 and the adhesion (connection) state between the electrode lead wire 414 and the lead wire 416 preferable.

As shown in FIGS. 5A and 5B, the front wall section 82 has a rectangular planar shape disposed vertically from a front side on the upper surface of the lower wall section 81 toward the upper side, and extending along a plane substantially perpendicular to the center axis Ax.

As shown in FIG. 5A, the front wall section 82 is provided with a first communication port 821 having a rectangular planar shape and for communicating the inside and the outside of the introducing air circulating unit 8A.

The tilted sidewall section 83 is a section for connecting the rear side of the lower wall section 81 and the upper side of the front wall section 82, and has a rectangular planar shape tilted downward along a backward direction.

As shown in FIGS. 5A and 5B, the tilted sidewall section 83 is provided with a second communication port 831 as a discharge port having a rectangular planar shape and for communicating the inside and the outside of the introducing air circulating unit 8A.

In the present embodiment, the second communication port 831 is formed to be larger than the first communication port 821.

Figure 7:
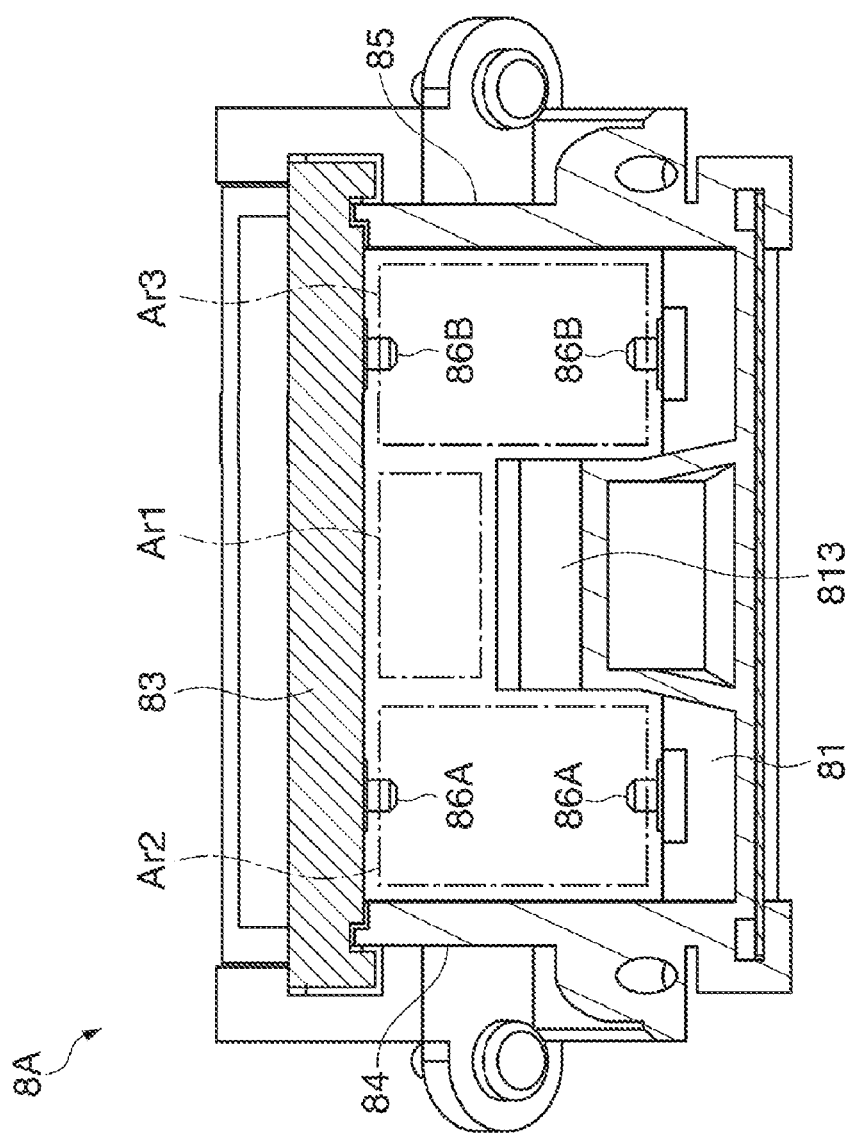
FIG. 7 is a diagram for explaining a function of the air flow guide members of the first embodiment.

Further, a lower surface of the tilted sidewall section 83 is provided with a pair of pivot sections 86A, 86B each having a cylindrical shape projected from the lower surface substantially perpendicularly to the lower surface, and with a predetermined distance in a horizontal direction (see FIG. 7).

It should be noted that the upper surface of the lower wall section 81 is also provided with a pair of pivot sections 86A, 86B each having a cylindrical shape corresponding respectively to the pair of pivot sections 86A, 86B of the tilted sidewall section 83, and projected substantially perpendicularly to the tilted sidewall section 83 (see FIG. 7).

The left sidewall section 84 and the right sidewall section 85 each have a planar shape of a rectangular triangle, and connect each of both left and right edges of the lower wall section 81, both left and right edges of the front wall section 82, and both left and right edges of the tilted sidewall section 83.

To the introducing air circulating unit 8A explained hereinabove, there is connected a duct for guiding the air ejected from a cooling fan to a predetermined position although specific illustration thereof is omitted.

Specifically, the duct is connected to an ejection port of the cooling fan, and at the same time, extends from the front side to the rear side, and is then connected to the first communication port 821 in the introducing air circulating unit 8A.

Further, the duct has a plate like blocking section extending from an end to a further rear side, and when connecting the duct to the introducing air circulating unit 8A, the duct blocks the second communication port 831 in the introducing air circulating unit 8A.

In other words, the air ejected from the cooling fan is introduced from the first communication port 821 to the introducing air circulating unit 8A via the duct. Further, the air introduced to the introducing air circulating unit 8A is further introduced to the space Ar via the sealing section channel 813, the first lower communication port 811, and so on without being leaked to the outside from the second communication port 831.

It should be noted that since the second light source device 4B has the posture vertically reversed around the center axis Ax with respect to the posture of the first light source device 4A as described above, the duct is connected to the air circulating unit 8 (the discharging air circulating unit 8B in the case of taking the first light source device 4A as a reference) located on the top surface section 21 side in substantially the same manner as described above.

Further, as shown in FIG. 4 or FIGS. 5A and 5B, a pair of air flow guide members 9 is respectively disposed inside the air circulating units 8 described above.

It should be noted that hereinafter in the inside of the introducing air circulating unit 8A, the air flow guide member 9 disposed on the left in view from the front side is described as a left-hand air flow guide member 9A (FIGS. 5A and 5B), and the air flow guide member 9 disposed on the right is described as a right-hand air flow guide member 9B (FIGS. 5A and 5B) for the sake of convenience of explanation.

Further, hereinafter, only the left-hand air flow guide member 9A will be explained. Since the right-hand air flow guide member 9B is disposed with the posture simply reversed vertically with respect to the posture of the left-hand air flow guide member 9A, the explanation therefor will be omitted.

Figure 6:
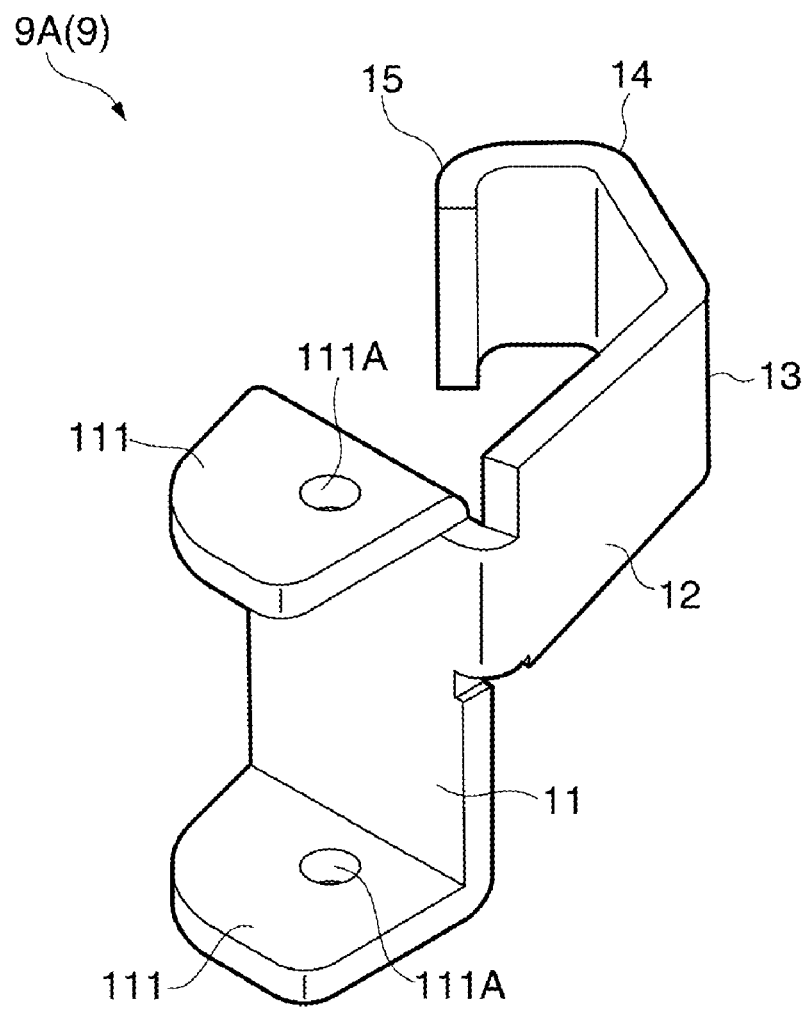
FIG. 6 is a perspective view showing a configuration of a left-hand air flow guide member in the first embodiment.

FIG. 6 is a perspective view showing the configuration of the left-hand air flow guide member 9A. Specifically, FIG. 6 is a perspective view of the left-hand air flow guide member 9A inside the introducing air circulating unit 8A in the posture state shown in FIG. 5A viewed from the front side.

As shown in FIG. 6, the left-hand air flow guide member 9A is formed by processing a plate member made of metal, and has an end area shielding section 11 and a central area shielding section 12 connected to form acute angles with each other, and to have a substantially L shape.

The end area shielding section 11 has a rectangular planar shape as shown in FIG. 6.

In the end area shielding section 11, the upper and lower edges thereof are provided with a pair of bearing sections 111 formed by folding the end area shielding section 11 substantially 90°.

The pair of bearing sections 111 is each provided with a bearing hole 111A allowing the pivot section 86A to be inserted therein.

As shown in FIG. 6, the central area shielding section 12 has a planar shape of an elongated rectangle bent from the upper right edge of the end area shielding section 11 toward the rear side thereof.

In the central area shielding section 12, as shown in FIG. 6, the tip thereof is bent leftward due to first through third bending sections 13 through 15.

Further, according to the shape described above, the left-hand air flow guide member 9A has the barycentric position Gp thereof located inside the L shape formed by the central area shielding section 12 and the end area shielding section 11 (see FIGS. 9A through 9C, 10A through 10C).

The left-hand air flow guide member 9A explained hereinabove is rotatably pivoted under its own weight with respect to the pair of pivot sections 86A when the pair of pivot sections 86A located on the left is inserted into the respective bearing holes 111A with the posture (the posture shown in FIG. 6) in which the central area shielding section 12 is located on the right rear side of the end area shielding section 11 inside the introducing air circulating unit 8A (see FIGS. 9A through 9C, 10A through 10C).

Further, unlike the left-hand air flow guide member 9A, the right-hand air flow guide member 9B is rotatably pivoted under its own weight with respect to the pair of pivot sections 86B when the pair of pivot sections 86B located on the right is inserted into the respective bearing holes 111A with the posture in which the central area shielding section 12 is located on the left rear side of the end area shielding section 11 inside the introducing air circulating unit 8A (see FIGS. 9A through 9C, 10A through 10C).

In other words, the left-hand air flow guide member 9A and the right-hand air flow guide member 9B are fixed symmetrically inside the introducing air circulating unit 8A.

Further, as described above, each of the pivot sections 86A, 86B is projected in the direction substantially perpendicular to the tilted sidewall section 83. Therefore, as shown in FIG. 4, each of the air flow guide members rotates under its own weight around a rotational axis RAx (each of the pivot sections 86A, 86B) substantially perpendicular to the tilted sidewall section 83 with the posture in which the tip portion of the central area shielding section 12 is tilted so as to come closer to the central axis Ax.

In other words, in the present embodiment, as shown in FIG. 4, the rotational axis RAx is tilted with respect to the vertical axis so that the side thereof distant from the central axis Ax is located on the rear side.

Function of Air Flow Guide Member

Then, the function of the air flow guide members 9 described above will be explained.

It should be noted that also in the following descriptions the first light source device 4A will be explained as a reference in substantially the same manner as described above.

Figure 8A:
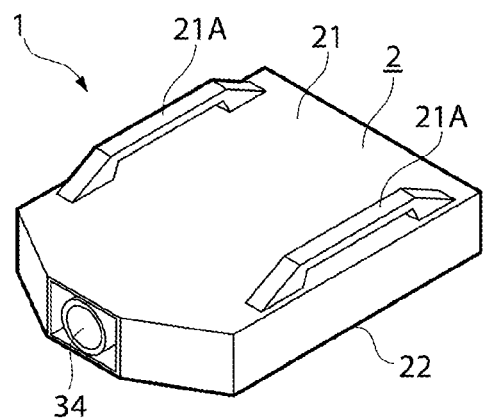
FIGS. 8A through 8C are diagrams for explaining the function of the air flow guide members of the first embodiment.
Figure 8B:
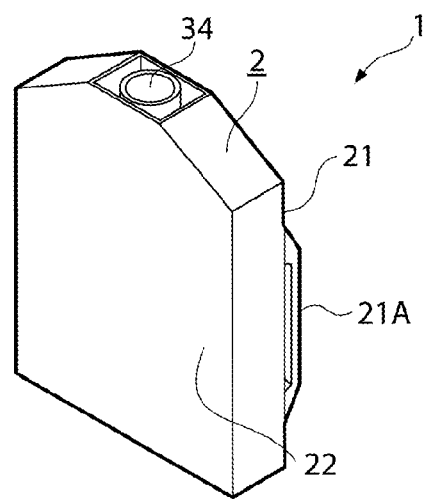
Figure 8C:
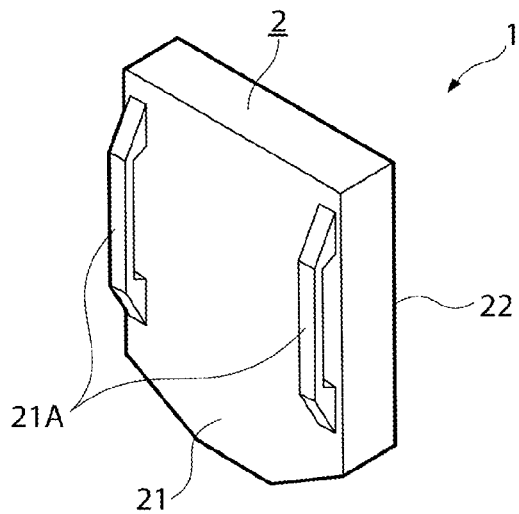
Figure 9A:
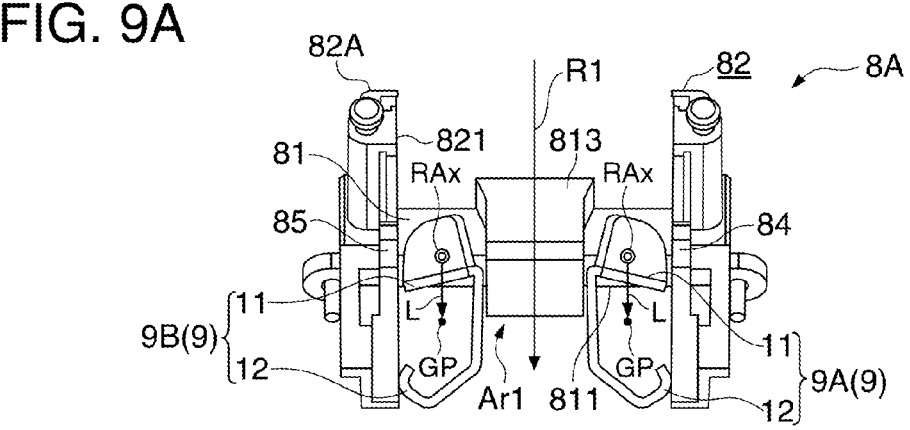
FIGS. 9A through 9C are diagrams for explaining the function of the air flow guide members of the first embodiment.
Figure 9B:
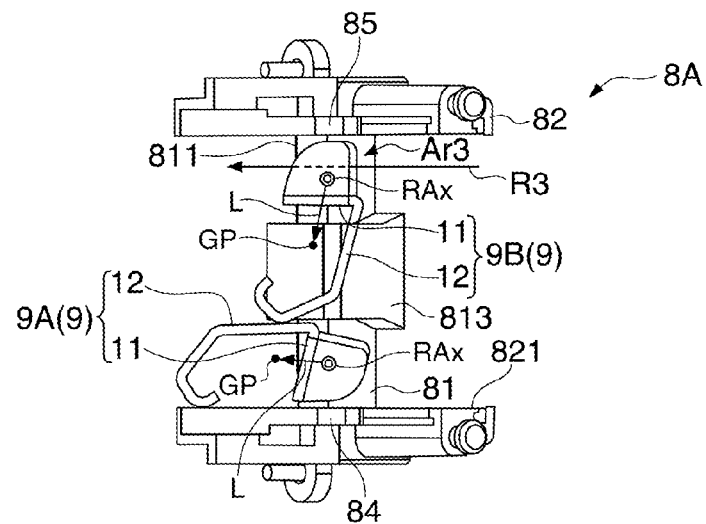
Figure 9C:
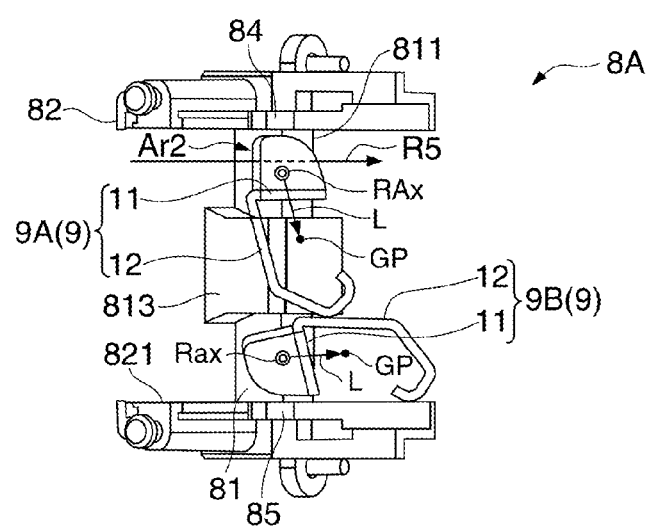
Figure 10A:
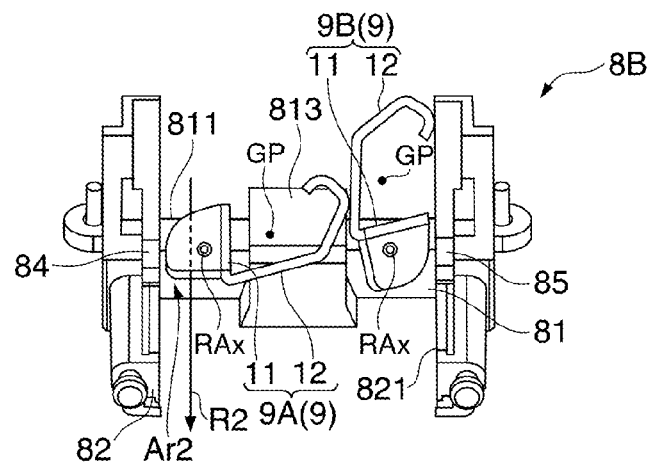
FIGS. 10A through 10C are diagrams for explaining the function of the air flow guide members of the first embodiment.
Figure 10B:
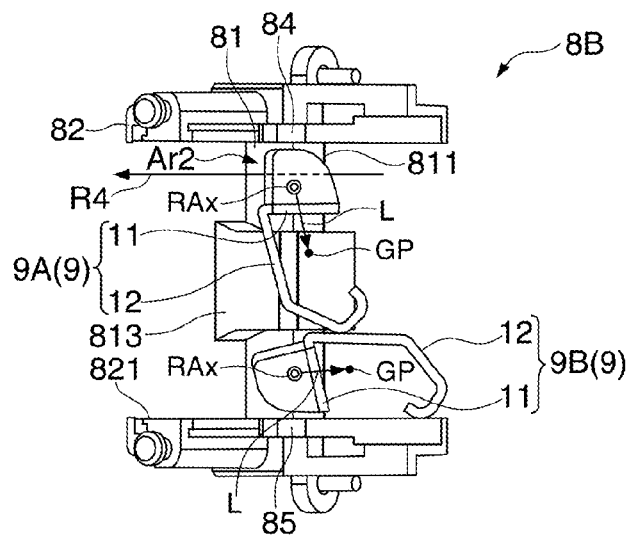
Figure 10C:
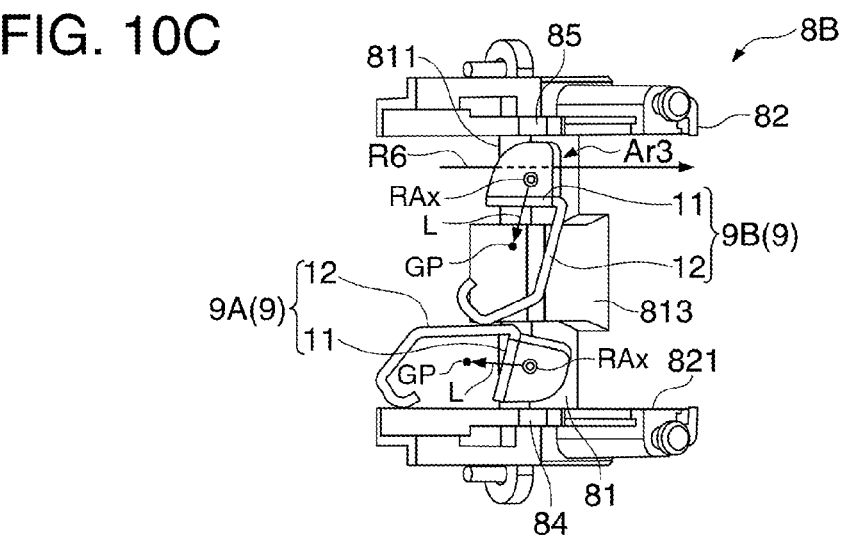
Figure 11A:
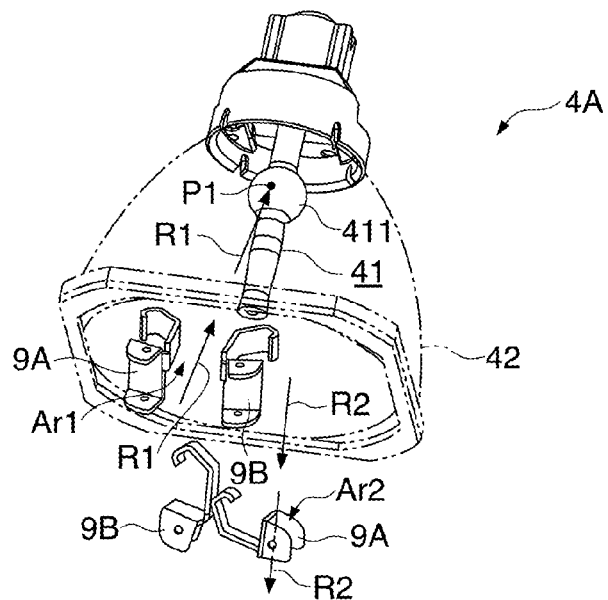
FIGS. 11A through 11C are diagrams for explaining the function of the air flow guide members of the first embodiment.
Figure 11B:
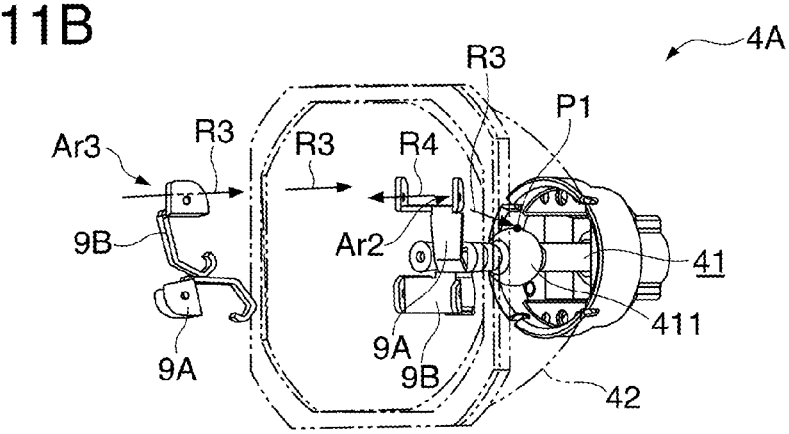
Figure 11C:
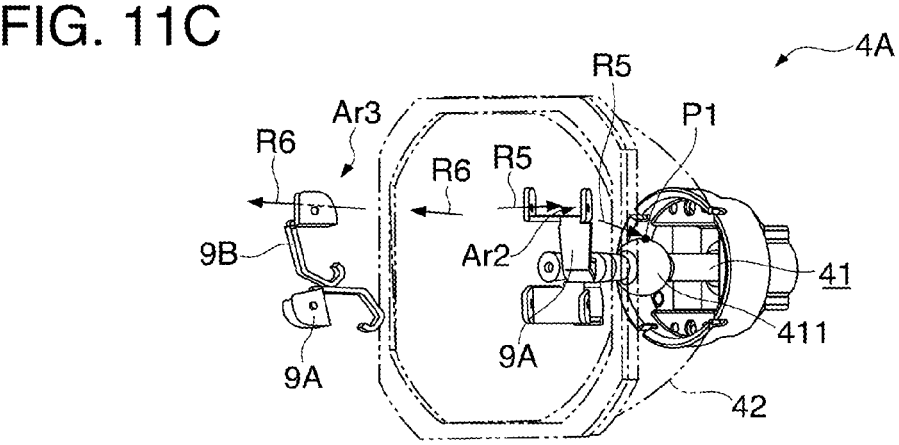

FIGS. 7, 8A through 8C, 9A through 9C, 10A through 10C, and 11A through 11C are diagrams for explaining the function of the air flow guide members 9. Specifically, FIG. 7 is a cross-sectional view of the introducing air circulating unit 8A cut by a plane perpendicular to the tilt direction of the tilted sidewall section 83. FIGS. 8A through 8C are diagrams schematically showing various postures of the projector 1. FIGS. 9A through 9C are diagrams of the postures of each of the air flow guide members 9 in the introducing air circulating unit 8A in the case in which the projector 1 is installed with various postures, viewed from the side of the tilted sidewall section 83. FIGS. 10A through 10C are diagrams of the postures of each of the air flow guide members 9 in the discharging air circulating unit 8B in the case in which the projector 1 is installed with various postures, viewed from the side of the tilted sidewall section 83. FIGS. 11A through 11C are diagrams for explaining the flow of the air in the case in which the projector 1 is installed with various postures.

It should be noted that in FIGS. 9A through 9C and 10A through 10C, the direction (the vertical direction) in which gravitational force is applied is set to be a downward direction in all of FIGS. 9A through 9C and 10A through 10C.

The air flow guide members 9 rotate under the own weight around the rotational axes RAx, thereby opening or blocking the areas Ar1 through Ar3 as shown below.

Specifically, in the inside of the introducing air circulating unit 8A, the flow passage of the air between the first communication port 821 and the first lower communication port 811 is divided into three areas, namely a central area Ar1 located at a substantial center in a horizontal direction and on the upper side of the sealing section channel 813, and end areas Ar2, Ar3 located on the left and right sides of the central area Ar1 as shown in FIG. 7.

Firstly, the action of each of the air flow guide members 9 attached to the introducing air circulating unit 8A and the action of each of the air flow guide members 9 attached to the discharging air circulating unit 8B in the case in which the projector 1 is installed with the normal setting posture (the same can be applied to the ceiling mount posture) shown in FIG. 8A will be explained in sequence.

In the introducing air circulating unit 8A, in the case in which the projector 1 is installed with the normal setting posture, the tip portion 82A of the front wall section 82 is located on the upper side, the lower wall section 81 is located on the lower side, and the direction (hereinafter referred to as a vertical direction) in which gravitational force is applied becomes a direction from the tip portion 82A to the lower wall section 81 as shown in FIG. 9A.

Therefore, as shown in FIG. 9A, each of the air flow guide members 9 rotates around the corresponding rotational axis RAx until the tip portion of each of the central area shielding section 12 touches the corresponding sidewall section 84, 85 on the ground of the bias of matching the direction L from the rotational axis RAx to the barycentric position Gp with the vertical direction caused by its own weight.

Further, in the state shown in FIG. 9A, each of the air flow guide members 9 is positioned at a first rotational position where the central area Ar1 is opened, and at the same time, the end areas Ar2, Ar3 are blocked with the respective end area shielding sections 11.

In contrast, in the discharging air circulating unit 8B, in the case in which the projector 1 is installed with the normal setting posture, the air flow guide members 9 are positioned at the respective first rotational positions similarly to the case of the air flow guide members 9 attached to the introducing air circulating unit 8A described above, or one of the air flow guide members 9 is positioned at the first rotational position while the other of the air flow guide members 9 is positioned at a second rotational position described below. In other words, in the case in which the air circulating unit 8 is positioned on the lower side, the control of the rotational state of the two air flow guide members 9 is failed.

For example, as shown in FIG. 10A, the left-hand air flow guide member 9A rotates around the rotational axis RAx until the tip portion of the central area shielding section 12 touches the central area shielding section 12 of the right-hand air flow guide member 9B, and is thus positioned at the second rotational position where the central area Ar1 is blocked with the central area shielding section 12, and at the same time, the end area shielding section 11 becomes substantially parallel to the left sidewall section 84 to thereby open the end area Ar2.

Further, as shown in FIG. 10A, the right-hand air flow guide member 9B is prevented from rotating because of the left-hand air flow guide member 9A having contact therewith, and is positioned at the first rotational position.

It should be noted that since the central area shielding section 12 is formed to be longer than the distance between the air flow guide members 9A, 9B, one of the air flow guide members 9 becomes to have contact with the other of the air flow guide members 9 when the one of the air flow guide members 9 is positioned at the second rotational position as described above.

Further, in the case in which the projector 1 is installed with the normal setting posture, each of the air flow guide members 9 acts as described above, thereby making the air ejected from the cooling fan flow as described below.

Specifically, the air ejected from the cooling fan passes through the central area Ar1 in the introducing air circulating unit 8A and flows from the front side toward the rear side to thereby be introduced to the space Ar, and is then locally fed to a vertex position P1 of the upper portion of the light emitting section 411 from above the light emitting section 411 as indicated by the arrow R1 shown in FIG. 9A or FIG. 11A.

Then, the air having been fed to the light emitting section 411 is introduced from the space Ar to the discharging air circulating unit 8B to be discharged to the outside from the second communication port 831, and at the same time, discharged to the outside from the first communication port 821 via the end area Ar2 as indicated by the arrow R2 shown in FIG. 10A or FIG. 11A.

Then, the action of each of the air flow guide members 9 attached to the introducing air circulating unit 8A and the action of each of the air flow guide members 9 attached to the discharging air circulating unit 8B in the case in which the projector 1 is installed with a upward projection posture (a posture in which the projection lens 34 is located on the upper side) shown in FIG. 8B will be explained in sequence.

In the introducing air circulating unit 8A, in the case in which the projector 1 is installed with the upward projection posture, as shown in FIG. 9B, the right sidewall section 85 is located on the upper side, the left sidewall section 84 is located on the lower side, and the vertical direction becomes to correspond to a direction from the right sidewall section 85 to the left sidewall section 84.

Therefore, as shown in FIG. 9B, the right-hand air flow guide member 9B rotates around the rotational axis RAx until the tip portion of the central area shielding section 12 touches the central area shielding section 12 of the left-hand air flow guide member 9A on the ground of the bias of matching the direction L with the vertical direction caused by its own weight. Therefore, the right-hand air flow guide member 9B is positioned at the second rotational position where the central area Ar1 is blocked with the central area shielding section 12, and at the same time, the end area shielding section 11 becomes substantially parallel to the right sidewall section 85 to thereby open the end area Ar3.

Further, as shown in FIG. 9B, the left-hand air flow guide member 9A is also positioned at the first rotational position in substantially the same manner on the ground of the bias of matching the direction L with the vertical direction caused by its own weight.

On the other hand, in the discharging air circulating unit 8B, in the case in which the projector 1 is installed with the upward projection posture, as shown in FIG. 10B, in contrast to the case of the introducing air circulating unit 8A, the left sidewall section 84 is located on the upper side, the right sidewall section 85 is located on the lower side, and the vertical direction becomes to correspond to a direction from the left sidewall section 84 to the right sidewall section 85.

Therefore, as shown in FIG. 10B, the left-hand air flow guide member 9A is positioned at the second rotational position, and the right-hand air flow guide member 9B is positioned at the first rotational position.

Further, in the case in which the projector 1 is installed with the upward projection posture, each of the air flow guide members 9 acts as described above, thereby making the air ejected from the cooling fan flow as described below.

Specifically, the air ejected from the cooling fan passes through the end area Ar3 in the introducing air circulating unit 8A and flows from the front side toward the rear side to thereby be introduced to the space Ar, and is then locally fed to a vertex position P1 (the vertex position on the right side viewed from the front side in the normal setting posture) of the upper portion of the light emitting section 411 from the left side in the light emitting section 411 viewed from the front side as indicated by the arrow R3 shown in FIG. 9B or FIG. 11B.

Then, the air having been fed to the light emitting section 411 is introduced from the space Ar to the discharging air circulating unit 8B to be discharged to the outside from the second communication port 831, and at the same time, discharged to the outside from the first communication port 821 via the end area Ar2 as indicated by the arrow R4 shown in FIG. 10B or FIG. 11B.

Finally, the action of each of the air flow guide members 9 attached to the introducing air circulating unit 8A and the action of each of the air flow guide members 9 attached to the discharging air circulating unit 8B in the case in which the projector 1 is installed with a downward projection posture (a posture in which the projection lens 34 is located on the lower side) shown in FIG. 8C will be explained in sequence.

In the introducing air circulating unit 8A, in the case in which the projector 1 is installed with the downward projection posture, as shown in FIG. 9C, in contrast to the case of the upward projection posture shown in FIG. 9B, the left sidewall section 84 is located on the upper side, the right sidewall section 85 is located on the lower side, and the vertical direction becomes to correspond to a direction from the left sidewall section 84 to the right sidewall section 85.

Therefore, as shown in FIG. 9C, the left-hand air flow guide member 9A is positioned at the second rotational position, and the right-hand air flow guide member 9B is positioned at the first rotational position.

On the other hand, in the discharging air circulating unit 8B, in the case in which the projector 1 is installed with the downward projection posture, as shown in FIG. 10C, in contrast to the case of the introducing air circulating unit 8A, the right sidewall section 85 is located on the upper side, the left sidewall section 84 is located on the lower side, and the vertical direction becomes to correspond to a direction from the right sidewall section 85 to the left sidewall section 84.

Therefore, as shown in FIG. 10C, the left-hand air flow guide member 9A is positioned at the first rotational position, and the right-hand air flow guide member 9B is positioned at the second rotational position.

Further, in the case in which the projector 1 is installed with the downward projection posture, each of the air flow guide members 9 act as described above, thereby making the air ejected from the cooling fan flow as described below.

Specifically, the air ejected from the cooling fan passes through the end area Ar2 in the introducing air circulating unit 8A and flows from the front side toward the rear side to thereby be introduced to the space Ar, and is then locally fed to a vertex position P1 (the vertex position on the left side viewed from the front side in the normal setting posture) of the upper portion of the light emitting section 411 from the right side in the light emitting section 411 as indicated by the arrow R5 shown in FIG. 9C or FIG. 11C.

Then, the air having been fed to the light emitting section 411 is introduced from the space Ar to the discharging air circulating unit 8B to be discharged to the outside from the second communication port 831, and at the same time, discharged to the outside from the first communication port 821 via the end area Ar3 as indicated by the arrow R6 shown in FIG. 10C or FIG. 11C.

It should be noted that although the explanation for the second light source device 4B is omitted, the air circulating unit 8 located on the side of the top surface section 21 functions as the introducing air circulating unit 8A, and the air circulating unit 8 located on the side of the bottom surface section 22 functions as the discharging air circulating unit 8B in substantially the same manner as described above.

According to the first embodiment described above, the following advantages are obtained.

In the present embodiment, the second tubular section 62 constituting the light source device 4 is provided with a pair of air circulating units 8 so as to be vertically symmetrical on the center axis Ax. Therefore, even in the case in which, in the dual-lamp projector 1 having two light source devices 4 with the same structure, the first light source device 4A and the second light source device 4B are disposed with postures vertically reversed to each other, the pair of air circulating units 8 are disposed so as to be vertically symmetrical with each other, and therefore, either one of the air circulating units 8 is naturally located on the upper side (the upper side in the case in which the projector 1 is installed with the normal setting posture) of the light emitting tube 41. In other words, in the case in which the projector 1 is installed with the normal setting posture, by introducing the external air into the space Ar via the introducing air circulating unit 8A, it becomes possible to efficiently feed the air to the vertex position P1 on the upper portion of each of the light emitting sections 411 from above each of the light emitting tubes 41, thus longer life of each of the light emitting tubes 41 can be achieved.

Further, since the air flow guide members 9 are provided inside the air circulating units 8, it becomes possible to straighten the air introduced into the space Ar via the introducing air circulating unit 8A with the air flow guide members 9, thus the air can be fed more efficiently to the vertex position P1 on the upper portion of the light emitting section 411.

Further, the air flow guide members 9, which are made to be able to rotate around the rotational axis RAx under the own weight, rotates to thereby open or block each of the areas Ar1 through Ar3 inside the air circulating units 8. Therefore, in the case in which the projector 1 is installed with the upward projection posture or the downward projection posture, the air flow guide members 9 rotate under the own weight to thereby make it possible to block the lower areas inside the introducing air circulating unit 8A with the air flow guide members 9 and open only the upper areas. In other words, by making the external air pass through only the upper areas inside the introducing air circulating unit 8A, it becomes possible to feed the air to the vertex position P1 on the upper portion of the light emitting section 411 from the lateral side of the light emitting tube 41.

Therefore, even in the case in which the projector 1 is installed with various postures (the normal setting posture (the ceiling mount posture), the upward projection posture, and downward projection posture), the air can efficiently be fed to the vertex position P1 on the upper portion of the light emitting section 411, and thus longer life of the light emitting tube 41 can be achieved.

Further, the rotational axis RAx is tilted with respect to the vertical axis as described above. Thus, in the case in which the projector 1 is installed with the normal setting posture, the air flow guide members 9 inside the introducing air circulating unit 8A rotate under the own weight to thereby be positioned at the first rotational position so that the tip portion faces to the rear side. Therefore, in the case in which the projector 1 is installed with the normal setting posture, the air flow guide members 9 can be prevented from unnecessarily blocking the flow passage of the introducing air circulating unit 8A to thereby make it possible for the air flow guide members 9 to appropriately straighten the air introduced into the space Ar via the introducing air circulating unit 8A, thus the air can be fed efficiently to the upper portion of the light emitting section 411.

Further, inside the air circulating units 8, there are disposed two air flow guide members 9 each provided with the central area shielding section 12 and the end area shielding section 11 side by side in the manner described above.

Thus, in the case in which the projector 1 is installed with the normal setting posture, the two air flow guide members 9 can be positioned at the respective first rotational positions. Therefore, by making the external air pass through only the central area Ar1 of the introducing air circulating unit 8A, it becomes possible to feed the air to the vertex position P1 on the upper portion of the light emitting section 411 from above the light emitting tube 41.

Further, in the case in which the projector 1 is installed with the upward projection posture or the downward projection posture, it is possible to position the air flow guide member 9 located on the upper side at the second rotational position, and to position the air flow guide member 9 located on the lower side at the first rotational position. Therefore, by making the external air pass through only the end area located on the upper side of the introducing air circulating unit 8A, it is possible to feed the air to the upper portion of the light emitting section 411 from the lateral side of the light emitting tube 41.

Therefore, in the case of installing the projector with various postures, the flow passage inside the introducing air circulating unit 8A is narrowed using the two air flow guide members 9 to thereby feed the air locally to the vertex position P1 on the upper portion of the light emitting section 411, thus the light emitting section 411 can efficiently be cooled.

Further, since the central area shielding sections 12 are each formed to be longer than the distance between the two air flow guide members 9, the central area shielding section 12 of one of the two air flow guide members 9 touches the central area shielding section 12 of the other of the two air flow guide members 9 when the one of the two air flow guide members 9 rotates to the second rotational position. Thus, in the case in which the one of the air flow guide members 9 has rotated to the second rotational position, it can prevent the other of the air flow guide members 9 from rotating to the second rotational position, and position the other of the air flow guide members 9 at the first rotational position. In other words, it is possible to prevent that both of the two air flow guide members 9 rotate to the respective second rotational positions to thereby make the respective central area shielding sections 12 overlap with each other.

Therefore, in the case of installing the projector 1 with various postures, it is possible to preferably achieve the advantage that the two air flow guide members 9 can smoothly be rotated to the desired rotational positions, and the air can be fed locally to the upper portion of the light emitting section 411 described above to thereby make it possible to efficiently cool the light emitting section 411.

Further, it is configured that the central area shielding section 12 and the end area shielding section 11 are connected so as to form an acute angle with each other, thereby making the end area shielding section 11 substantially parallel to the flow passage of the air when the air flow guide members 9 are positioned at the respective second rotational positions. Thus, in the case of installing the projector 1 with the upward projection posture or the downward projection posture, the external air passing through the end area located on the upper side of the introducing air circulating unit 8A is prevented from being changed in the flow direction by the end area shielding section 11, and is preferably straightened by the end area shielding section 11, thus it becomes possible to efficiently feed the air to the vertex position P1 on the upper portion of the light emitting section 411.

Further, since the second communication port 831 is provided to the air circulating unit 8, even in the case in which the two air flow guide members 9 inside the discharging air circulating unit 8B block the two areas out of the areas Ar1 through Ar3 of the discharging air circulating unit 8B, the area of the flow passage on the discharge side through which the air is discharged from the space Ar can be made larger than the area of the flow passage on the introduction side through which the air is introduced into the space Ar according to the second communication port 831 thus provided. Therefore, it becomes possible to prevent the air introduced to the space Ar from being retained in the space Ar to thereby improve the cooling efficiency of the light emitting tube 41.

Second Embodiment

Hereinafter, a second embodiment of the invention will be explained with reference to the accompanying drawings.

In the following explanations, similar structures and the same members as in the first embodiment are denoted by the same reference symbols, and detailed explanation therefor will be omitted or simplified.

Figure 12:
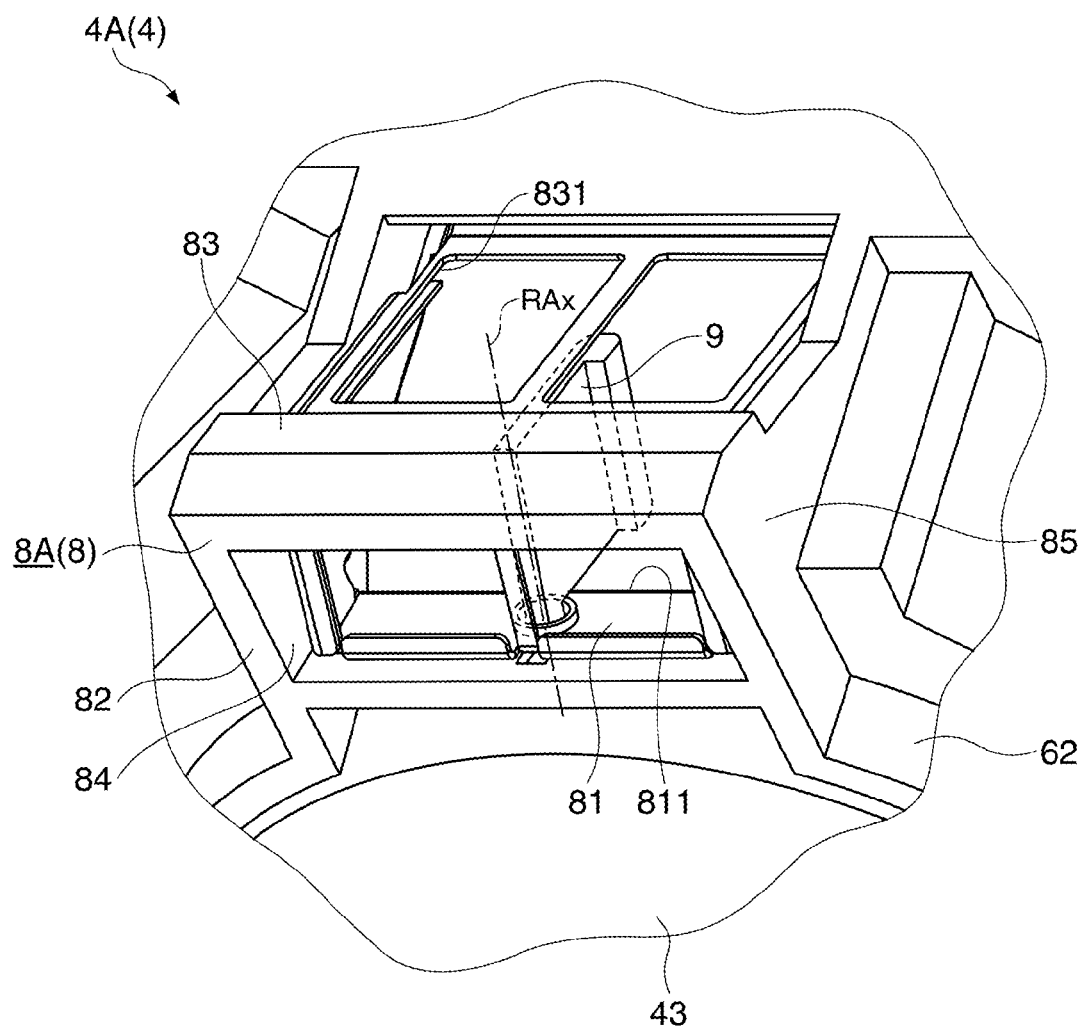
FIG. 12 is a diagram for explaining a air flow guide member of a second embodiment.

FIG. 12 is a diagram for explaining the air flow guide member 9 in the second embodiment. Specifically, FIG. 12 is an enlarged perspective view of the introducing air circulating unit 8A in the first light source device 4A.

In the second embodiment, the points different from the first embodiment will be as follows.

Although in the first embodiment the air circulating unit 8 is attached to the outer surface of the second tubular section 62, in the present embodiment, the air circulating unit 8 is formed integrally with the second tubular section 62 as shown in FIG. 12.

Further, although in the first embodiment, the second lower communication port 812 and the sealing section channel 813 for feeding the air to the tip portion of the front sealing section 412 are provided, in the present embodiment, the second lower communication port 812 and the sealing section channel 813 are omitted as shown in FIG. 12.

Further, although in the first embodiment a pair of air flow guide members 9 is provided inside the air circulating unit 8, in the present embodiment, only one air flow guide member 9 is provided as shown in FIG. 12.

Specifically, the air flow guide member 9 is formed to have a rectangular planar shape as shown in FIG. 12. Further, the air flow guide member 9 is formed to have the thickness of one end thereof larger than the thickness of the other end thereof, and is thus configured so as to have the center of gravity located on either one of the surfaces of the plate. Further, the air flow guide member 9 is pivoted inside the air circulating unit 8 on the other end thereof with the posture in which the surface of the plate extends along the vertical axis.

It should be noted that the rotational axis RAx (FIG. 12) of the air flow guide member 9 is tilted with respect to the vertical axis similarly to the first embodiment.

Further, in the present embodiment, the position where the air flow guide member 9 is pivoted to the inside of the air circulating unit 8 is set to substantially the center position in the lateral direction inside the air circulating unit 8 as shown in FIG. 12.

Then, a function of the air flow guide member 9 in the present embodiment will be explained based on FIGS. 8A through 8C and 13A through 13C.

It should be noted that also in the following descriptions the first light source device 4A will be explained as a reference in substantially the same manner as the first embodiment described above.

Figure 13A:
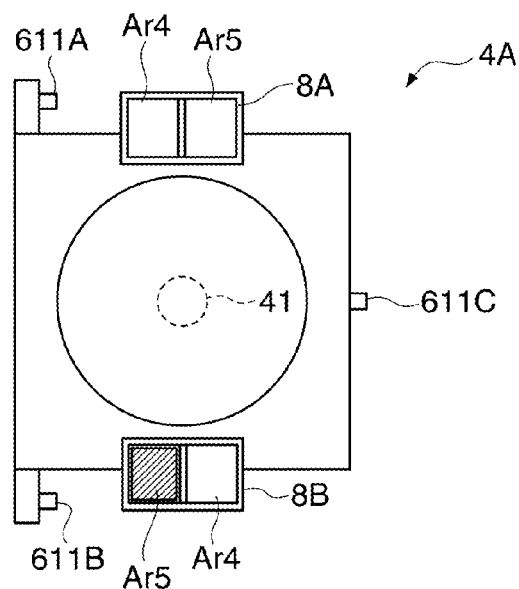
FIGS. 13A through 13C are diagrams for explaining the function of the air flow guide member of the second embodiment.
Figure 13B:
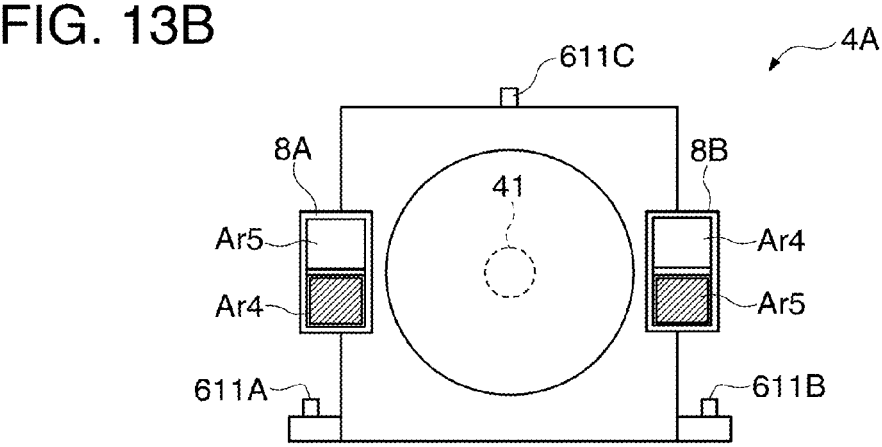
Figure 13C:
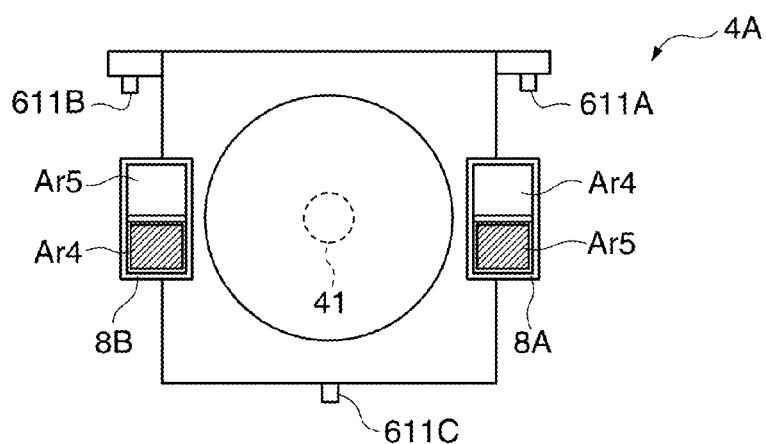

FIGS. 13A through 13C are diagrams for explaining the function of the air flow guide member 9. Specifically, FIGS. 13A through 13C are schematic diagrams of the first light source device 4A viewed from the front side.

It should be noted that the area blocked by the air flow guide member 9 is indicated by hatching.

The air flow guide members 9 rotate under its own weight around the rotational axis RAx, thereby opening or blocking the areas Ar4, Ar5 as described below.

Specifically, in the inside of the introducing air circulating unit 8A, the flow passage of the air between the first communication port 821 and the first lower communication port 811 is divided into two areas, namely the area Ar4 located on the left and the area Ar5 located on the right side.

Firstly, the case in which the projector 1 is installed with the normal setting posture shown in FIG. 8A will be explained.

The air flow guide member 9 (hereinafter referred to as an upper air flow guide member 9) attached to the introducing air circulating unit 8A rotates around the rotational axis RAx under its own weight so as to have one end located on the rear side, and take the posture (FIG. 12) for separating the areas Ar4, Ar5, and is positioned at an opening position where each of the areas Ar4, Ar5 is opened as shown in FIG. 13A.

On the other hand, the air flow guide member 9 (hereinafter referred to as a lower air flow guide member 9) attached to the discharging air circulating unit 8B is positioned at the opening position similarly to the upper air flow guide member 9 described above, or positioned at an blocking position described below. Specifically, in the case in which the air circulating unit 8 is positioned on the lower side, the control of the rotational state of the lower air flow guide member 9 is failed similarly to the case of the first embodiment described above.

For example, as shown in FIG. 13A, the lower airflow guide member 9 is positioned at the blocking position (hereinafter referred to as a first blocking position) where the area Ar4 is opened and the area Ar5 is blocked.

It should be noted that the air ejected from the cooling fan is fed to the upper portion of the light emitting section 411 similarly to the case of the first embodiment, and the second embodiment is different from the first embodiment only in the point that the air is introduced into the space Ar after passing through all of the areas Ar4, Ar5 in the introducing air circulating unit 8A, and the point that the air is discharged to the outside from the first communication port 821 after passing through the area Ar4 in the discharging air circulating unit 8B.

Then, the case in which the projector 1 is installed with the upward projection posture shown in FIG. 8B will be explained.

Since the introducing air circulating unit 8A takes the posture substantially the same as shown in FIG. 9B explained in the first embodiment described above, the upper air flow guide member 9 rotates around the rotational axis RAx under its own weight to thereby be positioned at a second blocking position where the area Ar5 located on the upper side is opened and the area Ar4 located on the lower side is blocked as shown in FIG. 13B.

On the other hand, since the discharging air circulating unit 8B takes the posture substantially the same as shown in FIG. 10B explained in the first embodiment described above, the lower air flow guide member 9 rotates around the rotational axis RAx under its own weight, and is positioned at the first blocking position as shown in FIG. 13B.

It should be noted that the air ejected from the cooling fan is fed to the upper portion of the light emitting section 411 similarly to the case of the first embodiment, and the second embodiment is different from the first embodiment only in the point that the air is introduced into the space Ar after passing through the area Ar5 in the introducing air circulating unit 8A, and the point that the air is discharged to the outside from the first communication port 821 after passing through the area Ar4 in the discharging air circulating unit 8B.

Finally, in the case in which the projector 1 is installed with the downward projection posture shown in FIG. 8C, the air circulating units 8A, 8B take the postures vertically reversed to the respective postures of the air circulating units 8A, 8B in the upward projection posture described above.

Therefore, as shown in FIG. 13C, the upper air flow guide member 9 is positioned at the first blocking position, and the lower air flow guide member 9 is positioned at the second blocking position.

It should be noted that the air ejected from the cooling fan is fed to the upper portion of the light emitting section 411 similarly to the case of the first embodiment, and the second embodiment is different from the first embodiment only in the point that the air is introduced into the space Ar after passing through the area Ar4 in the introducing air circulating unit 8A, and the point that the air is discharged to the outside from the first communication port 821 after passing through the area Ar5 in the discharging air circulating unit 8B.

According to the second embodiment described above, even in the case in which only one planar air flow guide member 9 is provided inside the air circulating unit 8, substantially the same advantage as in the first embodiment can be obtained.

Further, since the number of air flow guide members 9 can be reduced, and the shape of the air flow guide member 9 can also be simplified, cost reduction and simplification in the structure of the projector 1 can be achieved.

It should be noted that the invention is not limited to the embodiments described above but includes modifications and improvements in a range where the advantages of the invention can be achieved.

Although in each of the embodiments the second communication port 831 as the discharge port is provided to the air circulating unit 8, the invention is not limited thereto. Specifically, it is also possible to dispose the second communication port at any position in the second tubular section 62 different from the air circulating unit 8.

Although in each of the embodiments the projector 1 has the configuration including the three liquid crystal panels 331, the invention is not limited thereto. Specifically, the invention can be applied to a projector using two or less liquid crystal panels, or four or more liquid crystal panels.

In the embodiments described above, it is also possible to adopt reflective liquid crystal panels as the light modulation device, besides the transmissive liquid crystal panels. Further, it is also possible to adopt any light modulation device with other configurations providing the light modulation device is for modulating a luminous flux in accordance with image information to thereby form an image. For example, the invention can also be applied to a projector using a light modulation device other than the liquid crystal device, such as a device using micromirrors. In the case of using such a light modulation device, the polarization plates 332, 333 on the light entrance side and the light exit side can be eliminated.

Although in the embodiments described above, only an example of a front projection projector is cited, the invention can also be applied to a rear projection projector provided with a screen and for performing projection from the rear side of the screen.

The light source device according to the invention can be used as a light source device incorporated in a dual-lamp projector used for making a presentation or for a home theater.

The present application claims priority from Japanese Patent Application No. 2009-090120 filed on Apr. 2, 2009, which is hereby incorporated by reference in its entirety.

What is claimed is:

1. A light source device comprising:
    a light emitting tube having a light emitting section having a pair of electrodes disposed inside the light emitting section;
    a reflecting mirror adapted to reflect a luminous flux emitted from the light emitting section; and
    a tubular member disposed on a forward side of light emission of the reflecting mirror, and surrounding the light emitting tube,
    wherein the tubular member has a pair of air circulating units communicating inside and outside of the tubular member and adapted to allow introduction of external air from the forward side toward a backward side of the light emission in a vertically symmetrical manner on a center axis of the light emitting tube,
    inside the air circulating unit there is disposed an air flow guide member adapted to straighten the air introduced in the tubular member and make the air flow to the light emitting tube, and
    the air flow guide member is pivoted rotatably around a predetermined rotational axis with respect to the air circulating unit under own weight of the air flow guide member, and rotates to thereby open and block at least a part of a flow passage inside the air circulating unit.

2. The light source device according to claim 1, wherein the rotational axis is tilted with respect to the vertical axis so that a side distant from the center axis is located on the backward side of the light emission in view from a direction perpendicular to a vertical axis and the center axis.

3. The light source device according to claim 2, wherein the air flow guide member has a central area shielding section and an end area shielding section connected to each other so as to form a predetermined angle with each other,
    inside the air circulating unit, the air flow guide member is disposed at each of two positions located on a left side and a right side, respectively, side by side so that the respective end area shielding sections are separated from each other, and
    the two air flow guide members, when the flow passage of the air flowing inside the air circulating unit is divided into three areas of a central area located in a center of the flow passage and end areas located respectively on the left and right of the central area, to one of a first rotational position where the central area is opened and the end areas are blocked with the end area shielding section, or a second rotational position where the end areas are opened and the central area is blocked with the central area shielding section.

4. The light source device according to claim 3, wherein the central area shielding section is formed to be longer than a distance between the two air flow guide members, and the central area shielding section of one of the two air flow guide members touches the central area shielding section of the other of the two air flow guide members when the one of the two air flow guide members rotates to the second rotational position.

5. The light source device according to claim 4, wherein the central area shielding section and the end area shielding section are connected to each other so as to form an acute angle, and
    the end area shielding section is positioned so as to be parallel to the flow passage of the air flowing inside the air circulating unit when the air flow guide member is positioned at the second rotational position.

6. The light source device according to claim 2, wherein the tubular member has a discharge port adapted to discharge internal air to outside.

7. A projector comprising:
    the light source device according to claim 1;
    a light modulation device adapted to modulate a luminous flux emitted from the light source device in accordance with image information; and
    a projection optical device adapted to project the luminous flux modulated in the light modulation device,
    wherein the pair of light source devices is disposed so that the center axes are substantially aligned with and opposed to each other, and substantially perpendicular to a projection direction of the luminous flux from the projection optical device.

8. The projector according to claim 7, wherein the rotational axis is tilted with respect to the vertical axis so that a side distant from the center axis is located on the backward side of the light emission in view from a direction perpendicular to a vertical axis and the center axis.

9. The projector according to claim 8, wherein
the air flow guide member has a central area shielding section and an end area shielding section connected to each other so as to form a predetermined angle with each other,
inside the air circulating unit, the air flow guide member is disposed at each of two positions located on a left side and a right side, respectively, side by side so that the respective end area shielding sections are separated from each other, and
the two air flow guide members, when the flow passage of the air flowing inside the air circulating unit is divided into three areas of a central area located in a center of the flow passage and end areas located respectively on the left and right of the central area, to one of a first rotational position where the central area is opened and the end areas are blocked with the end area shielding section, or a second rotational position where the end areas are opened and the central area is blocked with the central area shielding section.

10. The projector according to claim 9, wherein:
the central area shielding section is formed to be longer than a distance between the two air flow guide members, and the central area shielding section of one of the two air flow guide members touches the central area shielding section of the other of the two air flow guide members when the one of the two air flow guide members rotates to the second rotational position.

11. The projector according to claim 10, wherein:
the central area shielding section and the end area shielding section are connected to each other so as to form an acute angle, and
the end area shielding section is positioned so as to be parallel to the flow passage of the air flowing inside the air circulating unit when the air flow guide member is positioned at the second rotational position.

12. The projector according to claim 8, wherein:
the tubular member has a discharge port adapted to discharge internal air to outside.

* * * * *